United States Patent
Stevens et al.

(10) Patent No.: US 10,554,719 B2
(45) Date of Patent: Feb. 4, 2020

(54) MANAGING STREAMED COMMUNICATION

(71) Applicant: BRITISH TELECOMMUNICATIONS PUBLIC LIMITED COMPANY, London (GB)

(72) Inventors: Timothy Stevens, London (GB); Ian Kegel, London (GB); Andrew Wills, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/514,647

(22) PCT Filed: Sep. 29, 2015

(86) PCT No.: PCT/EP2015/072383
§ 371 (c)(1),
(2) Date: Mar. 27, 2017

(87) PCT Pub. No.: WO2016/050747
PCT Pub. Date: Apr. 7, 2016

(65) Prior Publication Data
US 2017/0264665 A1 Sep. 14, 2017

(30) Foreign Application Priority Data
Sep. 30, 2014 (EP) .................................... 14250109

(51) Int. Cl.
*H04L 29/06* (2006.01)
*H04L 12/725* (2013.01)
(52) U.S. Cl.
CPC .......... *H04L 65/80* (2013.01); *H04L 45/3065* (2013.01); *H04L 65/105* (2013.01);
(Continued)

(58) Field of Classification Search
CPC ..................................................... H04L 65/80
See application file for complete search history.

(56) References Cited

U.S. PATENT DOCUMENTS 7,509,390 B1 * 3/2009 Raman ............... H04N 21/6125
709/213
7,564,876 B2 7/2009 Le Sauze et al.
(Continued)

FOREIGN PATENT DOCUMENTS

EP 2 605 523 6/2013

OTHER PUBLICATIONS

International Search Report for PCT/EP2015/072383, dated Nov. 17, 2015, 4 pages.
(Continued)

*Primary Examiner* — Andrew C Georgandellis
(74) *Attorney, Agent, or Firm* — Nixon & Vanderhye PC

(57) ABSTRACT

Methods, apparatus and systems are disclosed for managing streamed communication (such as video, audio, or audio-visual communication) between client devices and remote devices via a digital data communication network in situations where the data communication network comprises one or more routers operable to receive streamed data from one or more client devices and/or from one or more other routers, and to forward such streamed data to one or more remote devices and/or to one or more other routers such as to enable the client device and potentially-varying subsets of the one or more remote devices to participate in a communication session.

11 Claims, 13 Drawing Sheets

Proxy Module Process in respect of Incoming Streams

(52) U.S. Cl.
CPC .......... *H04L 65/605* (2013.01); *H04L 65/607* (2013.01); *H04L 65/608* (2013.01)

(56) References Cited

U.S. PATENT DOCUMENTS

| | | | |
|---|---|---|---|
| 8,839,340 B2 | 9/2014 | Van Deventer et al. | |
| 8,966,116 B2 | 2/2015 | Stevens et al. | |
| 2002/0176432 A1* | 11/2002 | Courtney | H04J 3/062 370/415 |
| 2004/0042601 A1* | 3/2004 | Miao | H04M 3/567 379/202.01 |
| 2006/0233322 A1* | 10/2006 | Allman | H04L 29/06027 379/88.01 |
| 2007/0153679 A1* | 7/2007 | Jost | H04N 21/23439 370/218 |
| 2007/0237185 A1* | 10/2007 | Pereira | H04N 21/2389 370/503 |
| 2008/0008089 A1 | 1/2008 | Bornstein et al. | |
| 2011/0205427 A1 | 8/2011 | Wang | |
| 2011/0302236 A1 | 12/2011 | Shrum, Jr. et al. | |
| 2013/0067116 A1* | 3/2013 | Ostergren | H04L 65/4069 709/248 |
| 2014/0288359 A1 | 9/2014 | Baaijens et al. | |
| 2014/0297811 A1 | 10/2014 | Stevens et al. | |
| 2015/0030022 A1* | 1/2015 | Mantin | H04L 65/80 370/390 |

OTHER PUBLICATIONS

Written Opinion of the ISA for PCT/EP2015/072383, dated Nov. 17, 2015, 6 pages.
Search Report for EP 14 25 0109, dated Mar. 16, 2015, 8 pages.
Fan et al., "Dynamic Topology Configuration in Service Overlay Networks: A Study of Reconfiguration Policies", Infocom 2006, 25th IEEE International Conference on Computer Communications, Apr. 23-29, 2006, 12 pages.
Jin et al., "Serving Dynamic Groups in Application-Level Multicast", HPSR. 2005 Workshop on High Performance Switching and Routing, 2005, 5 pages.
Weinstein, "Multipoint Videoconferencing Goes Virtual", Wainhouse Research Jun. 2012, (12 pages).
Demand Letter for PCT/EP2015/072383, dated Aug. 1, 2016, 4 pages.
Direct/Informal Comments Letter for PCT/EP2015/072383, dated Sep. 29, 2015, 2 pages.

* cited by examiner

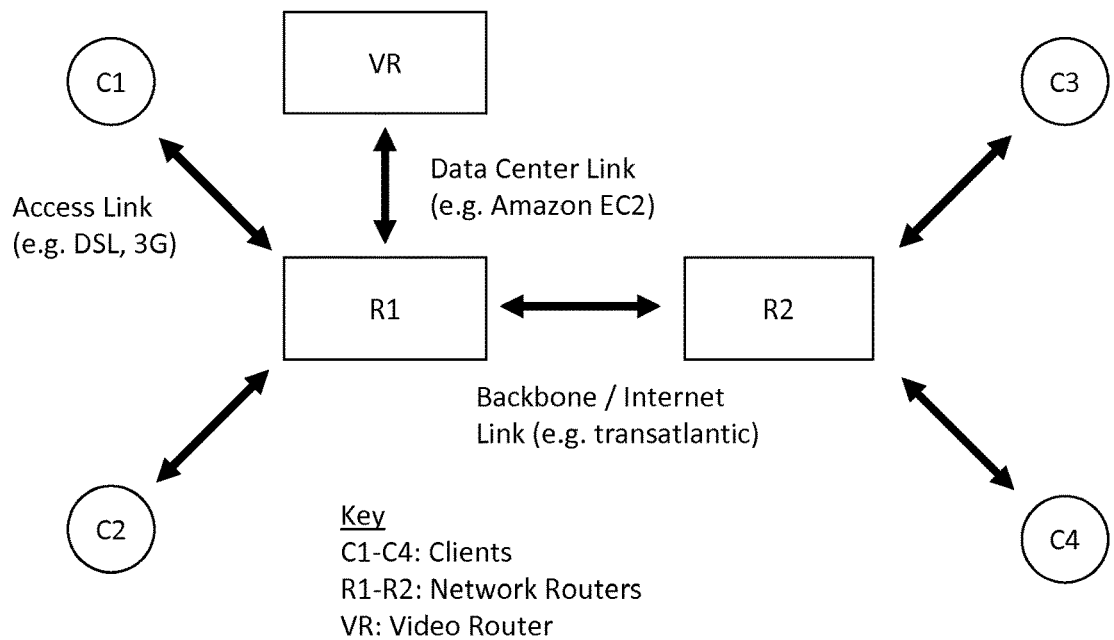
Figure 1 - Example Topology and Components
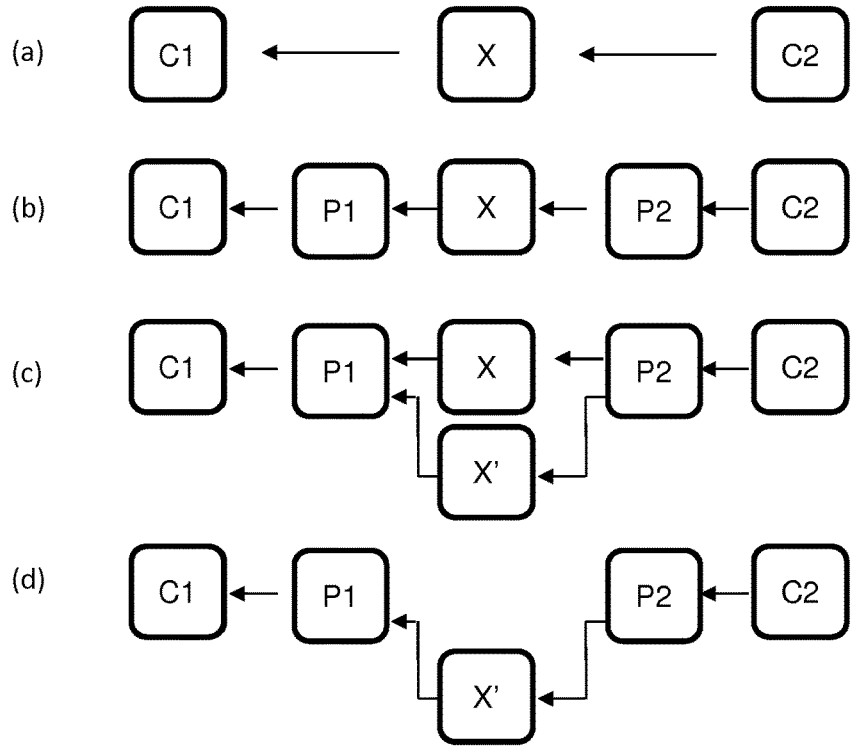
Figure 5 – Use of Proxies for Switching Streams

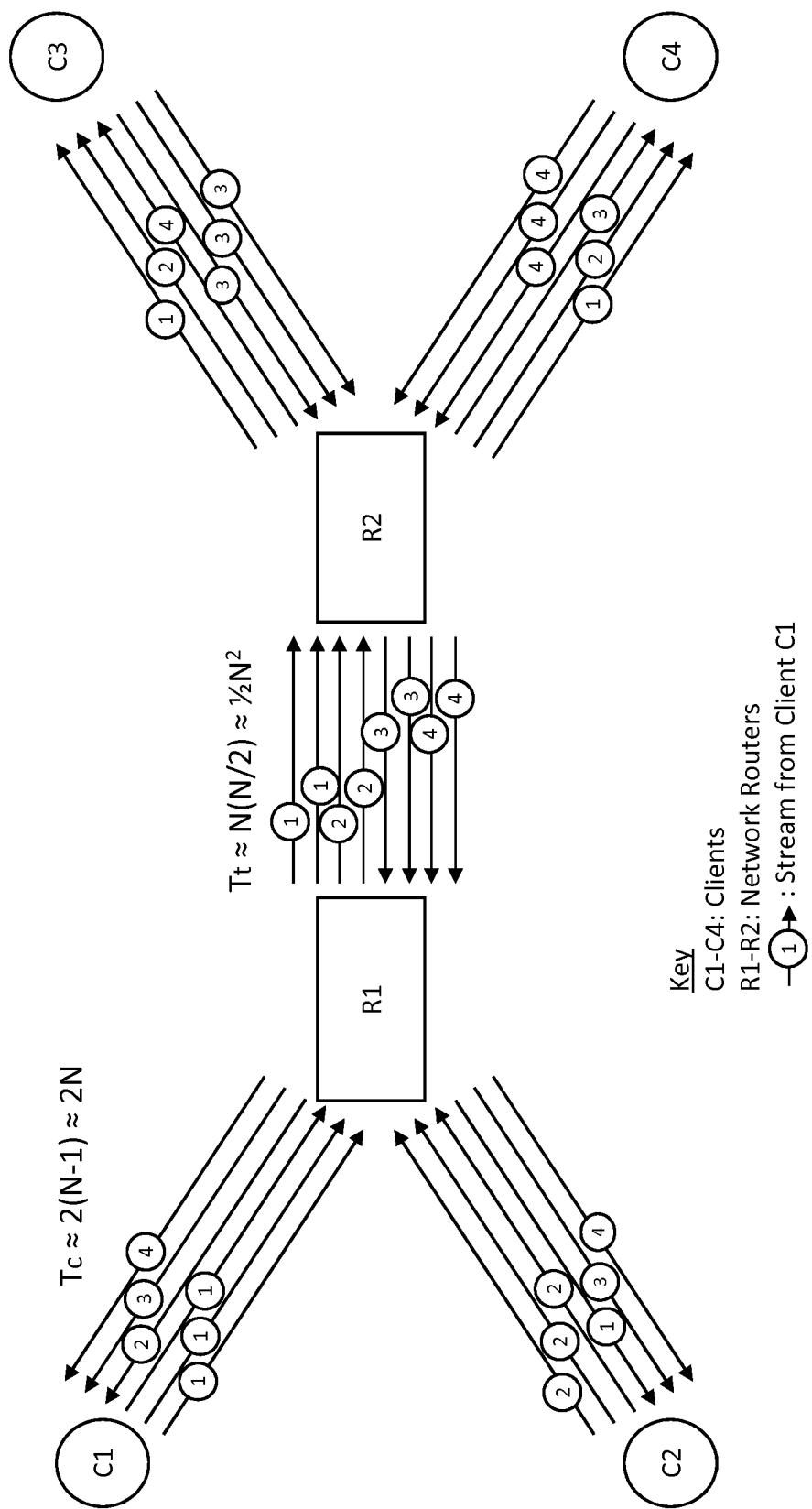
Figure 2 – Scenario Without Dedicated Video Router

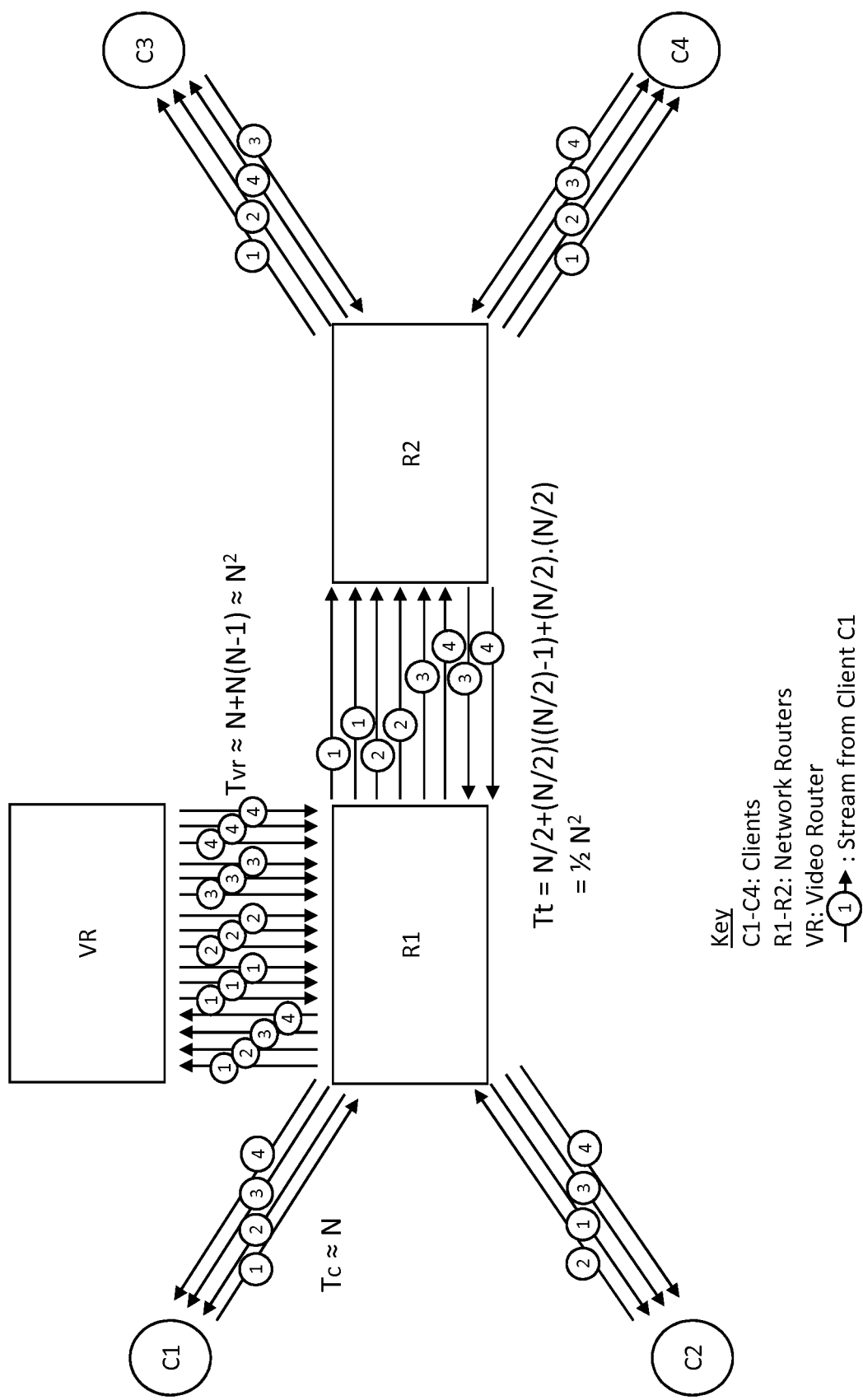
Figure 3 - Scenario With One Dedicated Video Router

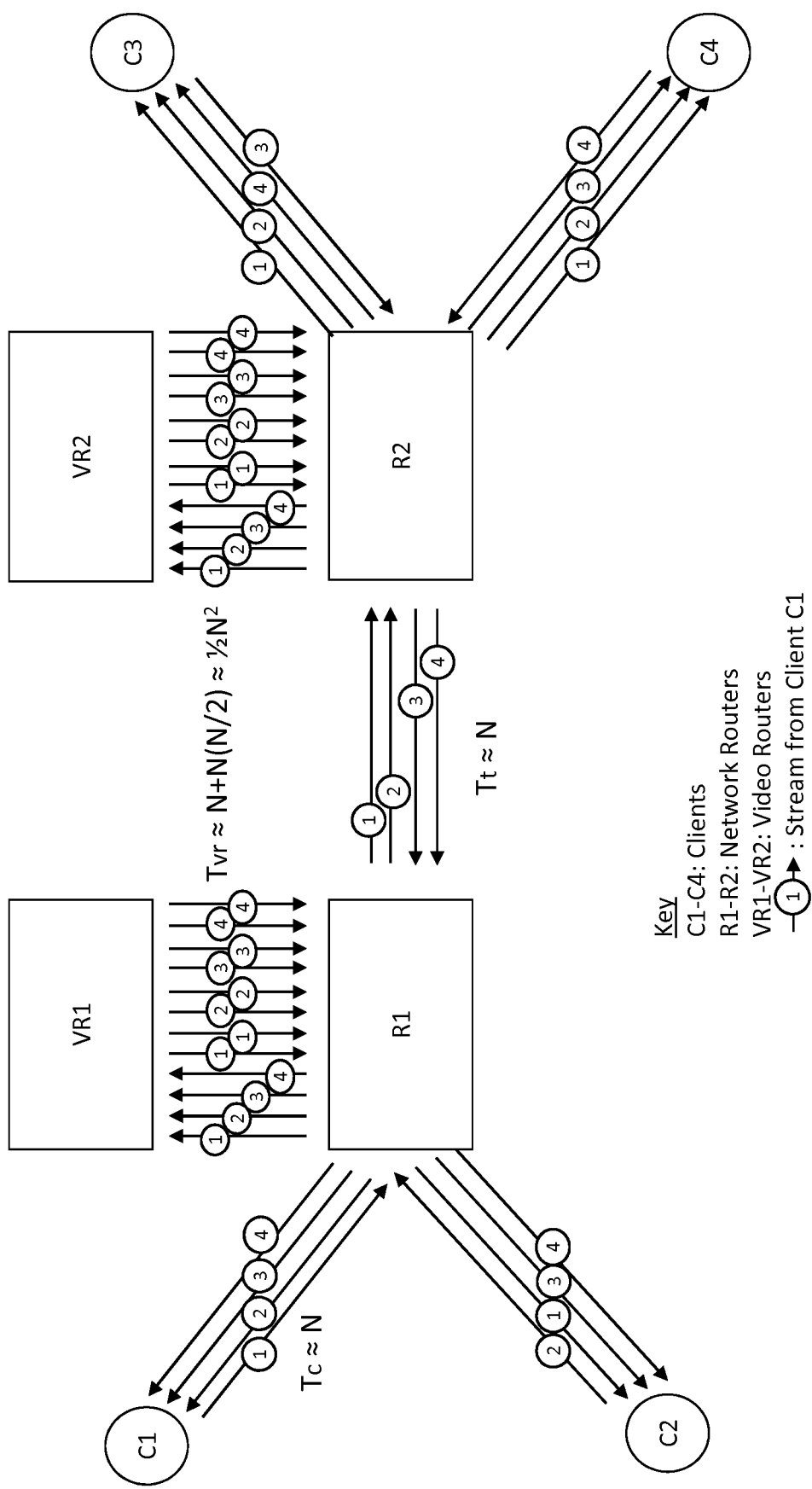
Figure 4 - Scenario With Two Cascaded Video Routers

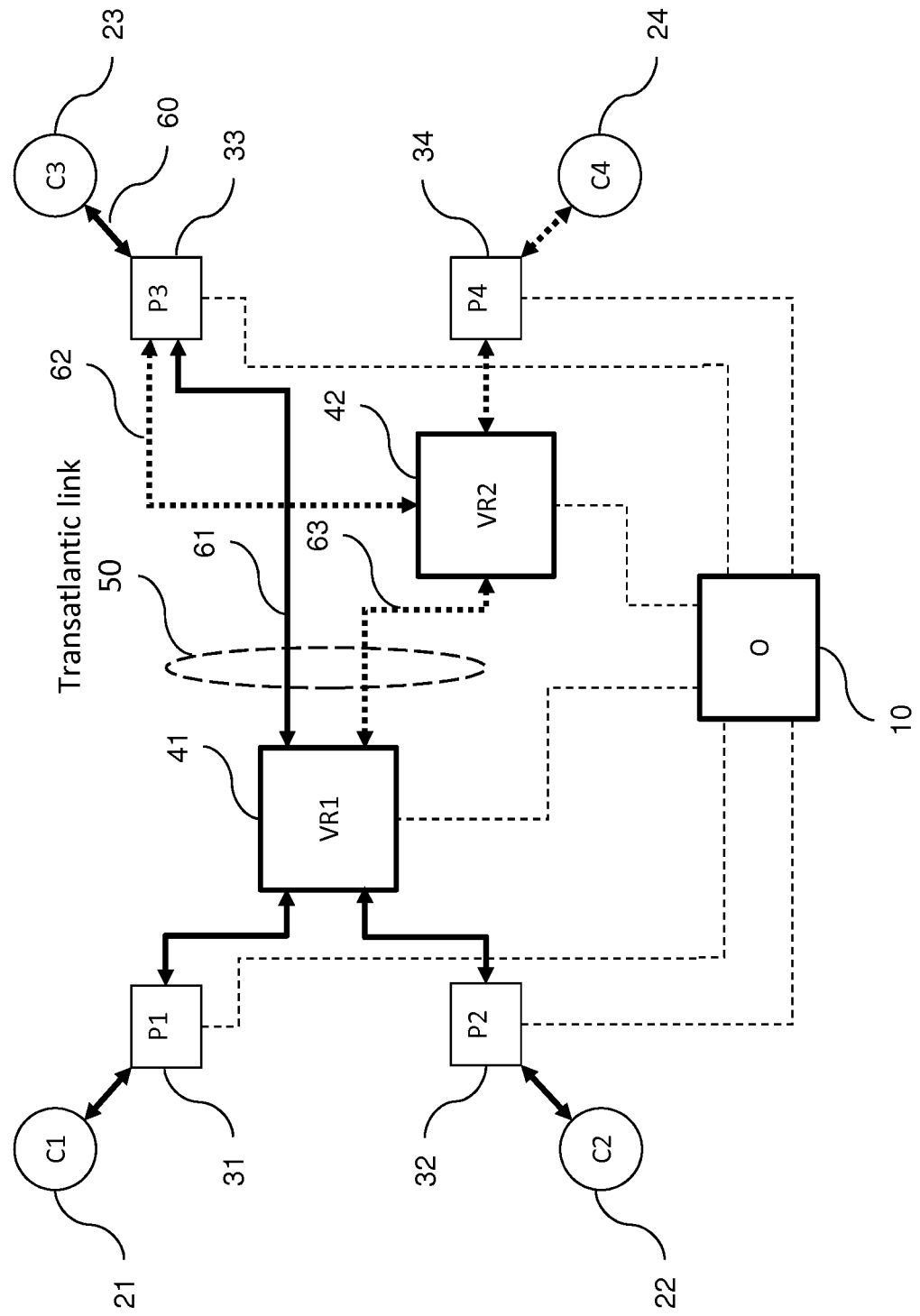
Figure 6 – Switching Streaming Topology Using Proxies

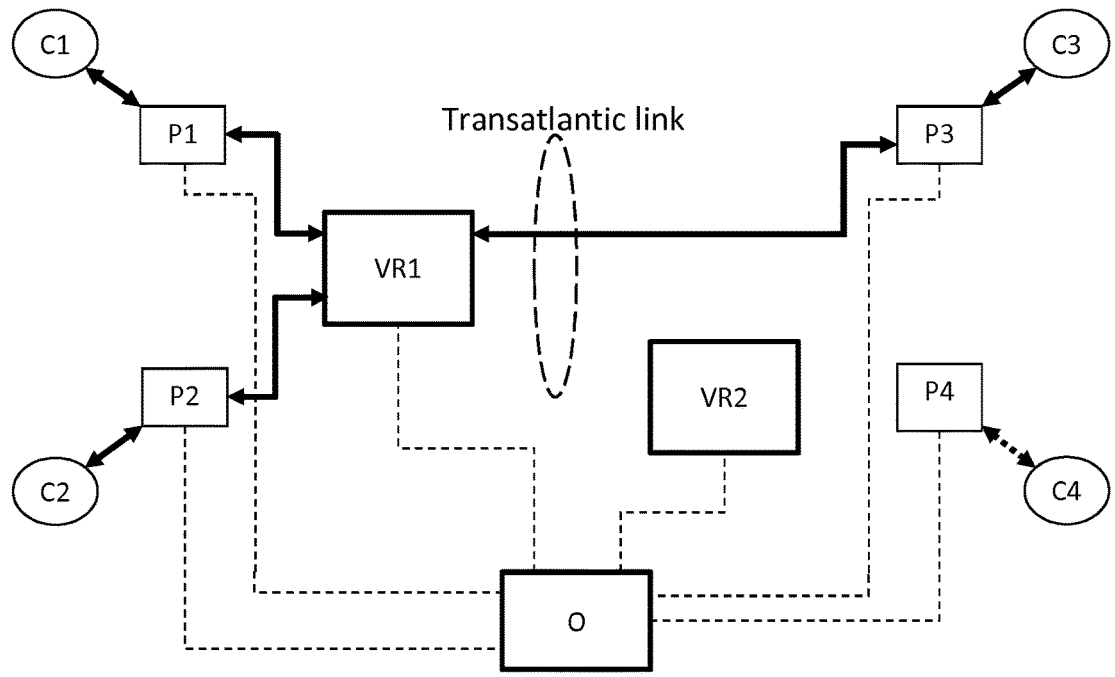
Figure 7(a) - Streaming Topology Before Switch
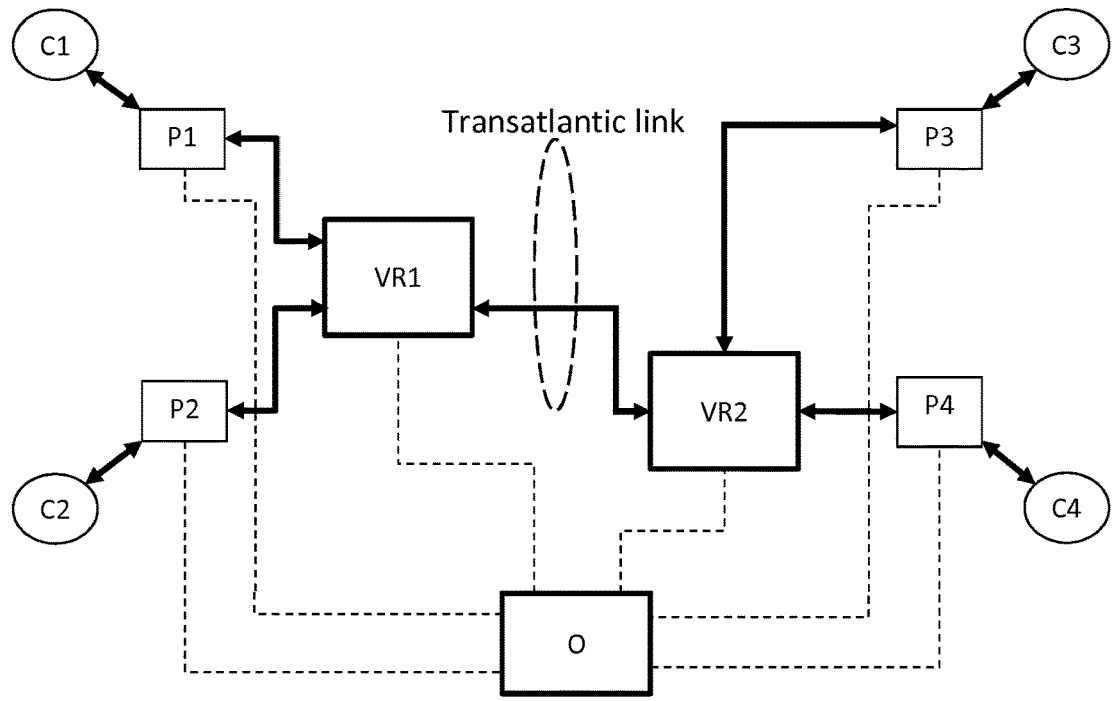
Figure 7(b) - Streaming Topology After Switch
Figure 7

Figure 8 – Process for Switching Streaming Topology Using Proxies

Figure 12 – Proxy Module Process in respect of Incoming Streams

MANAGING STREAMED COMMUNICATION

This application is the U.S. national phase of International Application No. PCT/EP2015/072383 filed 29 Sep. 2015, which designated the U.S. and claims priority to EP Patent Application No. 14250109.7 filed 30 Sep. 2014, the entire contents of each of which are hereby incorporated by reference.

TECHNICAL FIELD

The present invention relates to managing streamed communication. Aspects and preferred embodiments relate to methods, apparatus and systems for managing streamed communication (such as video, audio, or audio-visual communication) between client devices and remote devices via a digital data communication network, in particular in situations where the data communication network comprises one or more routers operable to receive streamed data from one or more client devices and/or from one or more other routers, and to forward such streamed data to one or more remote devices and/or to one or more other routers such as to enable the client device and potentially-varying subsets of the one or more remote devices to participate in a communication session.

BACKGROUND TO THE INVENTION AND PRIOR ART

Internet Protocol (IP) networks are required to route several types of content, with differing requirements of reliability, speed, latency, scaling and bandwidth utilisation. Increasingly, such networks are being used to deliver video content, both point-to-point and also point-to-multipoint (analogous to broadcast television, where there may be large numbers of clients consuming the same television programme). In the latter case, an important goal in many situations is to reduce the number of simultaneous streams that need to be transmitted: for example, a strategy whereby a sender transmits a discrete stream of content for every client (unicast) is very inefficient in terms of network utilisation and computational resources. Additionally, in this approach, the sender needs to maintain knowledge of all the clients which are consuming the content at any time, since a unique IP stream must be generated for each client.

Several solutions have been proposed or adopted to address these issues. Streaming proxies can help in the unicast case, in that they can accept an input stream, and replicate it to multiple clients, thus removing the need for the content server to maintain a record of active clients, and also allowing the streaming proxy to be located topologically closer to the clients (i.e. closer in terms of network nodes and links), and possibly "better" located to them in terms of factors such as the cost of using the necessary links, or in terms of the likely network performance thereon (e.g. round-trip time (RTT) or delay, jitter, reliability, etc.).

In situations requiring higher numbers of clients, various forms of Content Delivery Networks (CDNs) and/or multicast (IP-layer, or higher-level) are used (BBC "iPlayer", etc.). A typical CDN is a system that can serve content from multiple servers at various locations, in order to spread the system load, and to dynamically adjust various parameters such as routing in response to changing demand and possible other network issues.

These approaches cater well for content that changes relatively slowly (i.e. content is generally added and deleted perhaps a few times a day), and for situations where clients join and leave at any time. They generally assume a network topology that is either fixed or varying slowly. Techniques based on Application-Layer Multicast (ALM) allow extra intelligence to be added in order to manage the stream distribution better—this becomes more important in cases where both the sources and clients may join and/or leave frequently.

In cases where two (or more) parties are taking part in a video-enabled chat, the networking requirements change, in that there is no longer necessarily a 'producer' and 'consumer(s)' of the video; all parties may essentially be peers. This situation places additional demands on the network topology when large numbers of separate n-way video sessions are required, as may be the case in relation to a multi-party video-enabled discussion forum, for example.

Many existing techniques (such as video-conferencing technologies, for example) assume that a network topology is generated and/or dimensioned before or at the start of a call or session, and that this will fundamentally not change throughout the call. Changes are generally limited to adding or removing streams as clients join or leave. Other changes may be for example to switch from multicast to unicast (perhaps with some local caching) if a client needs to pause the feed, for example.

Additionally, traditional networks have generally been designed with resilience and reliability as fundamental requirements. These have generally been addressed by adding link redundancy, which generally works well for IP-based protocols. However, real-time video communication with relatively high bandwidth streams places demands on network performance which can currently add significant cost if a consistently high quality of experience (QoE) is required.

PRIOR ART TECHNIQUES

A paper entitled "Dynamic Topology Configuration in Service Overlay Networks: A Study of Reconfiguration Policies" by Jinliang Fan and Mostafa Amar (available online at http://www.cc.gatech.edu/~ammar/papers/infocom06-JLfan.pdf) discusses cost-optimisation and dynamic reconfiguration for overlay networks (not native ones). It also references techniques such as Application-Level Multicast (ALM). It describes a method for dynamically determining the optimal topology of an overlay network, and acknowledges the potential disruption to customer experience as a cost of dynamic changes. It will be noted that it does not propose solutions for avoiding that disruption for any service scenario.

A paper: "Serving Dynamic Groups in Application-Level Multicast" by Xing Jin, Wan-Ching Wong and S.-H. Gary Chan available at www.cse.ust.hk/~gchan/papers/HPSR05 SALM.pdf introduces the concept of subset Application-Level Multicast for data broadcasting. The use-cases discussed (which relate to share prices and news stories) are predicated on a "publish-and-consume" model, and the paper describes how mesh network can be built to efficiently distribute such content. It explores the efficacy of three algorithms used for determining the network efficiency by determining the relative delay penalty and link stress in networks consisting of up to 1024 nodes. It addresses the determination and development of efficient distribution of content, but it will be noted that it does not address scenarios in which the network topology would change mid-session and in which avoiding disruption due to network configurations is either likely or critical to the user's experience of the service.

US Patent Application US2008/0008089, entitled "Optimal route selection in a content delivery network", relates to overlay networks and their configuration, and relates to approaches to find the optimum node configuration. While this addresses the challenge of efficient content distribution in CDN, it will be noted that it does not propose any mechanisms for supporting a session during network reconfiguration, nor does it consider a network in which all the end nodes are essentially peers, both transmitting and receiving content. Further it determinedly addresses an overlay transmission network in the form of a CDN.

U.S. Pat. No. 7,564,876, entitled "Method of resynchronizing streams benefiting from circuit emulation services", relates to jitter management. This is limited to resynchronising streams, not for network optimisation.

A paper entitled "Multipoint Videoconferencing Goes Virtual" (available online at http://www.wainhouse.com/files/papers/wr-mp-vc-goes-virtual.pdf) describes methods of distributing video traffic in a video calling system. This discusses how the use of scalable video coding techniques (H.264 SVC) can be used to provide cost advantages by allowing switching in Multipoint Control Units (MCUs) to take place without the need to transcode the media stream, and how this can offer benefits in relation to transmit time and CPU requirements. It will be noted that it does not relate to how the user experience of a video call could be maintained while a network undergoes topology changes in response to changes in the patterns of communication in the group video call, however.

In the field of simple one-directional video/audio data playing to a single end-user (as opposed to multi-party streamed communication such as video-conferencing), US Patent Application US2011/205427 discusses how slowing down and speeding up the playback of video can be used to make a buffer last longer in the event of loss of transmission when receiving a video stream.

Referring to prior patent citations, European application EP2605523 ("Comcast") relates to systems and methods of adaptive streaming, and particularly to techniques for synchronizing timing across multiple streams. Transcoded copies of a source stream may be aligned with one another such that independently specified portions of each transcoded stream occur at the same locations within the content. These transcoded copies may be produced by one or more transcoders, whose outputs are synchronized by a delay adjuster. It will be noted that the document does not relate to situations in which the respective copies have traversed different network paths, via different routers, let alone to techniques in which there is a switch between copies that have traversed different network paths, via different routers.

U.S. Pat. No. 8,839,340 ("Van Deventer et al") relates to techniques for synchronizing first and second media streams that are being transmitted by a media source in a network via first and second media paths to one or more terminals. Timing information associated with arrival times of media packets in the media streams is measured using a measuring module positioned at a first location in the media paths. Buffer instructions are generated for a buffer on the basis of the timing information, the buffer being positioned at a second location in one of the media paths. Media packets transmitted over the media path to the terminals may then be delayed such that arrival times of media packets at the terminals are synchronized.

US application US2011/302236 ("Shrum et al") relates to systems and methods for dynamic content stream management, in which a selection of a content element is received and an encoding scheme selected. The content element is transmitted to a requesting client in the selected encoding scheme. During transmission, a different encoding scheme may be selected according to changing conditions, such as network congestion. The client may be switched over to receive the content element in the new encoding scheme instead of the originally selected encoding scheme.

SUMMARY OF THE INVENTION

According to a first aspect of the invention, there is provided a method of managing streamed communication between a client device and one or more of a plurality of remote devices via a digital data communication network, the data communication network comprising a plurality of routers each operable to receive streamed data from one or more of said devices and/or from one or more other routers, and to forward said streamed data to one or more of said devices and/or to one or more other routers, the method comprising, at a proxy module associated with the client device:

intercepting streamed data intended to be received from one or more of said remote devices by the client device via at least one of the routers of the digital data communication network whereby to receive, at the proxy module, a first instance of said streamed data in one or more first router-side streams from at least one of said routers, and streaming said data in one or more client-side streams from the proxy module to the client device;

receiving at the proxy module in one or more second router-side streams from at least one of said routers a second instance of streamed data corresponding to the first instance of streamed data while still receiving the first instance of streamed data in said one or more first router-side streams;

comparing the first and second instances of streamed data whereby to determine a discrepancy measure indicative of whether the first and second instances are synchronised with each other, and if not, introducing a delay into one or other of said instances whereby to decrease or remove any discrepancy in synchronisation between the respective instances; then switching from streaming data received in said first instance in said one or more client-side streams from the proxy module to the client device, to streaming data received in said second instance in one or more client-side streams from the proxy module to the client device.

By decreasing or removing any such discrepancy in synchronisation between the respective instances before performing the switching between them, preferred embodiments are able essentially to mitigate or counteract the effect thereof on the experience of an end-user, from whose point of view the switching will generally be at least partially masked.

According to preferred embodiments, the streamed data may comprise streamed video, audio or audio-visual data. Embodiments of the invention may be applicable in relation to streamed data of other types, however.

Techniques to which preferred embodiments relate may be applicable particularly in relation to scenarios where the streamed data comprises data being streamed using an "unreliable" or "non-guaranteed" delivery protocol such as the User Datagram Protocol (UDP), which does not rely on the provision of notifications from receivers to senders as to the delivery of transmitted data. Embodiments of the invention may also be applicable in relation to scenarios where the streamed data comprises data being streamed using a "reliable" or "guaranteed" delivery protocol such as the Transmission Control Protocol (TCP), however.

According to preferred embodiments, the first and second instances of streamed data may comprise the same data (e.g. exactly the same video or audio-visual content). Alternatively, the first and second instances of streamed data may comprise different data, in which the first instance may comprising data corresponding to but not the same as the second instance (e.g. different views of the same event, different resolution versions of the same content, etc.).

According to preferred embodiments, the one or more second router-side streams may be established in response to an indication that the streamed data intended to be received by the client device from the one or more remote devices should be received from a different one of the routers, thereby causing the second instance of streamed data to be received at the proxy module. With such embodiments, there may be a step of receiving an indication that data intended to be streamed between the client device and the one or more remote devices should be streamed via a different one of the routers. This step may comprise receiving an instruction from a predetermined control entity. Such an "indication" need not be in the form of an instruction, however, and there need not be a predetermined control entity. The "indication" may instead be in the form of information about the entities involved in a communication session and/or about the links between them and/or about the network in general, or about changes to any of these. The proxy module may instead receive such information, and itself determine therefrom that data intended to be streamed between the client device and the one or more remote devices should be streamed via a different one of the routers. Such a determination may be made individually by the proxy module, or collaboratively with other entities, perhaps corresponding entities acting as proxy modules in respect of other client devices involved in the communication session. Other types of "topology-change" indication may also be used in relation to particular embodiments and scenarios.

According to preferred embodiments, the first and second instances of streamed data are received by the proxy node from different routers, having traversed different routes thereto.

According to preferred embodiments, the discrepancy measure determined in the comparing step may be a measure indicative of whether the first and second instances of streamed data are synchronised with each other on receipt at the proxy module. It may however be an estimate of whether the first and second instances of streamed data are likely to be synchronised with each other on receipt at the client device, or a measure indicative in another way of whether the first and second instances are synchronised with each other.

According to preferred embodiments, the discrepancy measure determined in the comparing step is a measure indicative of respective times of receipt at the proxy module of corresponding elements of the streamed data in the first and second instances. Such elements may be individual data packets (identified perhaps by packet numbers), particular frames of video data (such as Intra Frames (I-Frames), for example), marks (such as electronic "water-marks") which may be included in the streams for this particular purpose or otherwise, or other such elements allowing for a determination to be made of whether the first and second instances are synchronised with each other.

According to preferred embodiments, the switching is performed at a time dependent on the content of the data being streamed in the first and/or second router-side streams. If, for example, the streaming is being performed in accordance with a coding scheme such as MPEG-4 (H.264), which uses I-Frames, the switching operation may be triggered, for example, by the arrival of an I-Frame in the first and/or second router-side stream(s). The arrival of corresponding I-Frames in corresponding first and second router-side streams may allow the two router-side streams themselves to be synchronised or matched to each other, possibly by appropriate buffering in the proxy device or in the client device, before, during, or after the switch, in order to ensure that the switch from coupling the "old" router-side stream(s) with the client-side stream(s) to coupling the "new" router-side stream(s) with the client-side stream(s) may be as seamless as possible from the point of view of the user in question. Other aspects of the content of the data being streamed, such as packet sequence numbers, may be used as well as or instead of the presence of I-Frames.

According to preferred embodiments, the step of comparing may comprise determining whether one or more elements of the second instance have arrived at the proxy module associated with the client device before or after one or more corresponding elements of the first instance, and if before, introducing a delay into the second of said instances prior to said switching then gradually decreasing said delay after said switching; and if after, gradually introducing a delay into the first of said instances prior to said switching. In such embodiments, in the event of a determination that the one or more elements of the second instance have arrived at the proxy module associated with the client device before the one or more corresponding elements of the first instance, the delay introduced into the second instance prior to switching may be decreased to zero after said switching according to a profile dependent on a user requirement. This may relate to a personal preference, to a desired behaviour, to the type of application an end-user is using, or other factors. In some cases, one or step-changes in speed may be appropriate, but in general, a gradual change such as an s-shaped speed profile may be appropriate. Similarly, in the event of a determination that the one or more elements of the second instance have arrived at the proxy module associated with the client device after the one or more corresponding elements of the first instance, the delay introduced into the first instance prior to switching may introduced according to a profile similarly dependent on a user requirement.

According to preferred embodiments, the method may further comprise a step of terminating the one or more first router-side streams after said switching has been performed.

According to a second aspect of the invention, there is provided a proxy module for managing streamed communication to a client device from one or more of a plurality of remote devices via a digital data communication network, the data communication network comprising a plurality of routers each operable to receive streamed data from one or more of said devices and/or from one or more other routers, and to forward said streamed data to one or more of said devices and/or to one or more other routers, the proxy module being associated with the client device and being operable to perform a method according to any embodiment of the first aspect.

According to a third aspect of the invention, there is provided a system for managing streamed communication between a plurality of client devices via a digital data communication network, the data communication network comprising a plurality of routers each operable to receive streamed data from one or more of said client devices and/or from one or more other routers, and to forward said streamed data to one or more other client devices and/or to one or more other routers, the system comprising:
- a plurality of proxy modules, each proxy module being associated with one or more of said client devices and being operable to perform a method according to any embodiment of the first aspect; and
- a control module operable to determine whether data intended to be streamed between one client device and another client device should be streamed via a different one of the routers, and if so, to issue a routing-change indication in respect of such a determination.

It should be noted that a proxy module may be said to be "associated" with a particular client device in the sense that the two are functionally associated. This should not be taken to mean that the proxy module must be inside or outside the client device with which it is associated, nor that it must even be within the same premises or home network as that client device. It may however be a functional module within a client device such as a home computer, or may be incorporated into a home hub, a home gateway, or another such routing and/or gateway device, for example.

The various options and preferred embodiments referred to above in relation to the first aspect are also applicable in relation to the second and third aspects.

Techniques to be described below relate to ways in which data networks can be used to provide real-time audio-visual and other types of streamed communication. Such techniques may be used to allow for a network topology to be changed dynamically, in response to changing conditions and/or changes in the number, identities and/or locations of the participating clients, for example, without (noticeably) interrupting the flow of communication signalling and data between those clients. This differs from the traditional situations such as standard video-conferencing, where client or server nodes may simply be added or removed, and where the network routing is not changed or intended to be changed during the duration of the communication session. The ability to modify the topology in real time, without disrupting the end user's experience, offers advantages because it provides an opportunity to optimise the way the network is used in terms of cost or other factors which may be important to the network operator, to a controlling party, and/or to the participating clients.

In particular, techniques to be described below relate to ways in which slight discrepancies in synchronisation between two different instances of a stream of data—which might otherwise lead to a delay or jump that would be noticeable to the receiving user, and therefore detrimental to the receiving user's overall experience when switching from receiving one instance to receiving the other instance—may be effectively masked from the receiving user.

By way of an example, consider a video chat-room service in which participants from anywhere in the world can join a multi-party video-call at any time of day. Such a service may be analogous to text-based chat-rooms, which are already commonplace, but the use of video means that each chat-room client must have the ability to transmit a live stream from their own camera, while at the same time receiving multiple live streams from other chat-room participants. The chat-room may be configured to display a low-resolution version of every participant's stream for each participant in a 'mosaic'-style presentation, or may perhaps select a subset of streams based on participants' activity and/or preferences. Either way, the nature of the chat-room will mean that participants are likely to join and leave in an ad hoc manner, with each join or leave event resulting in a change to the network topology of the whole system. Furthermore, it could be expected that most participants will be active during the daytime (or perhaps evening) hours in their respective time-zones, and therefore that on a global scale, the participant population will 'migrate' across different global locations as time progresses through each 24-hour period. This scenario illustrates a key challenge addressed by techniques to be described because such a video chat-room should be capable of providing a continuous customer experience 24 hours per day, but it would be advantageous for an operator of such a chat-room to be able to adjust the network topology in order to minimise the cost of carrying chat-room traffic between participants, and to manage the transmission of the live streams in a more efficient way.

The prior disclosures referred to above cannot easily be applied to the scenario of such ad hoc video communication where the optimal network configuration may change significantly during a session (in which it may be important that communication between users is not disrupted). For example, in the case where each endpoint has at least one video camera, the management of bandwidth (and other 'cost' measures, such as end-to-end latency, video encoding/decoding processing requirements etc.) may become challenging, particularly in the case of asymmetric networks, where the upstream bandwidth is generally small compared to the downstream bandwidth.

Techniques to be described below thus relate in particular to the problem of how to avoid the experience of participants in a communication session such as a video communication session from being disturbed when a network is reconfigured during a communication session. They relate particularly to (but not only to) scenarios such as wide-scale video "chat" or conferencing services in which communication takes place within groups that may emerge and decline in a more or less ad hoc fashion.

In such scenarios, a controlling entity, the participants or a network operator may be able to determine the best network topology to deliver the required experience for the participants, and react or provide instructions such that the network is able to be reconfigure to adopt such a topology. The manner in which such determinations are made and the factors on which such determinations may be based will be discussed briefly, but it will be understood that the technique is concerned primarily with the manner in which the entities involved implement any resulting topology change and/or react to instructions in relation to this.

In such scenarios, the network may, from time to time, change its configuration, including for example the location of key functionality (such as Multipoint Control Units, MCUs). Normally, using prior techniques, any such changes would significantly disturb any current session as the session would have been set up between specific nodes, and if these nodes are changed (which they will be due to any such topology change), the user session would either terminate or be significantly interrupted as the traffic routing models are recalculated.

Preferred embodiments involve the use of proxy modules associated with each user, which intercept media streams being sent by and intended to be received by the user concerned (along with any appropriate signalling data). The proxy module in respect of a user from which a stream is being sent forwards the media stream and signalling into the network, and is able to do so to more than one node, each of which may be a normal router, a dedicated video router, or another such node. If it is decided to change the network topology and that change requires a user to send its media stream and signalling to a different node, the system prepares for this change by establishing one or more additional media streams and signalling paths to the node as are required in the new topology.

Once any required new streams are established, the system can switch from the original topology to the new topology (closing the original media and signalling stream(s) if required after the switch has taken place). The outward proxy module is (for the duration of the switching process) sending data over both topologies at once, but does not generally disturb the experience of the user concerned significantly, if at all because the user's application has at all times been sending/receiving its media and any signalling to/from a fixed address—that of the proxy module—and there will (effectively) have been an uninterrupted path for the media and signalling into/from the network at all times. The smoothness of the switch is more dependent on the receiving-end proxy module which should aim to switch between two incoming streams as near as possible to instantaneously (as it can only 'forward' one of them to its client at a time).

Such preferred embodiments may thus enable improved or best possible user experience to be maintained in video and other such communication sessions by allowing the network to be changed during a specific session without significantly affecting an end user's experience.

Key benefits of such embodiments may be of use both to network operators and to users of the communication system. An operator may benefit from efficiencies relating to capacity: depending on implementation decisions, they could require less redundancy (number of nodes or links) since they would be able to reconfigure routings more dynamically.

Users may benefit from a more consistent video (or other such) experience: delays could be more controllable (particularly in the cases where the communication session spans inter-continental routes where propagation delays may be significant) by dynamically relocating key components to place them closer to the optimum endpoints. Importantly, this means that a communication signal between two ad hoc endpoints which happen to be in the same country need not be sent to a different continent and back again, which could incur a significant round-trip delay.

Additionally, the presence of dynamically-movable components could enable additional services to be provided, such as allowing multi-party video calls to split off from larger calls, or conversely for larger calls to be aggregated from smaller groups.

An important factor in relation to the above is that the users' experiences need not be adversely or appreciably affected by any such dynamic reconfiguration.

BRIEF DESCRIPTION OF THE DRAWINGS

A preferred embodiment of the present invention will now be described with reference to the appended drawings, in which:

FIG. 1 shows an example topology for a video communication session between four clients, and the components involved therein, including one video router;

FIG. 2 shows the data streams involved in a communication session between four clients in a scenario without a video router;

FIG. 3 shows the data streams involved in a communication session between four clients in a scenario with one video router;

FIG. 4 is shows the data streams involved in a communication session between four clients in a scenario with two video routers;

FIG. 5 illustrates the concept of using proxies for switching between data streams;

FIG. 6 illustrates how streaming topology may be changed during a communication session between four clients, using a method according to a preferred embodiment;

FIG. 7(*a*) shows the streaming topology in respect of the scenario illustrated in FIG. 6 before the topology change;

FIG. 7(*b*) shows the streaming topology in respect of the scenario illustrated in FIG. 6 after the topology change;

DESCRIPTION OF PREFERRED EMBODIMENTS OF THE INVENTION

Figure 8:
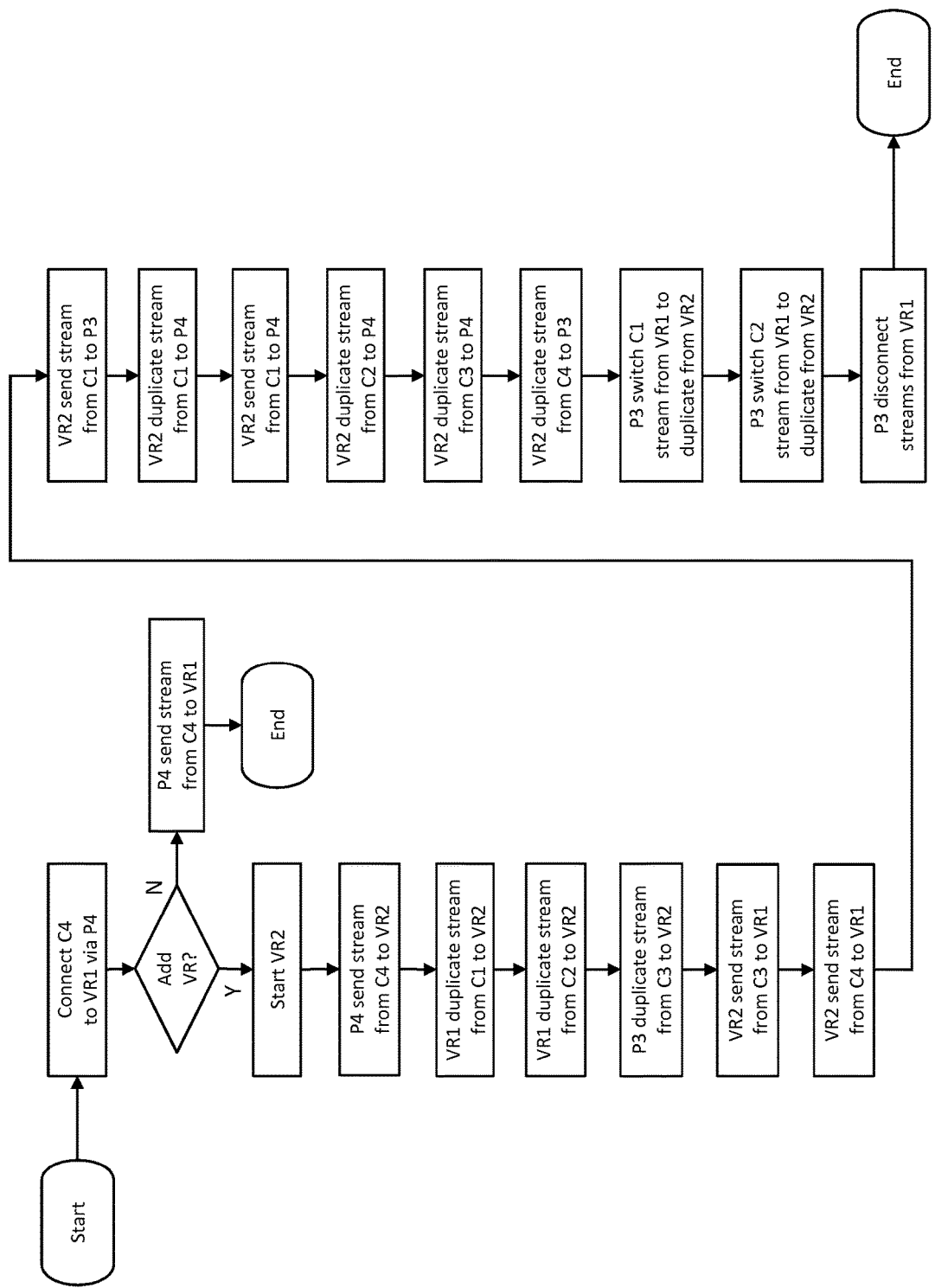
FIG. 8 shows possible steps that may be carried out in a system comprising one or more proxy modules operating according to preferred embodiments in order to manage streamed communication.

With reference to the accompanying figures, and in particular to FIGS. 9 to 15, a method and associated apparatus for performing a communication management technique according to a preferred embodiment of the invention will be described.

The present embodiment relates to video (which may be audio-visual) communication, although it will be understood that embodiments of the invention may be applicable in relation to pure audio or other types of streamed communication. The present embodiment allows dynamic changes in network topology to be effected through the use of one or more dedicated "multi-stream" routers which will be referred to as Video Routers (VRs) in the case of video (or audio-visual) communication. Such dedicated routers will generally be present in addition to one or more "normal" network routers which may serve their normal function of forwarding data across a network towards an intended destination. A video router in this context is a network component that is capable of switching real-time video streams between one or more source inputs and one or more destination outputs. Additionally, a video router can replicate streams to multiple outputs (1:n). Video routers may be cascaded such that the output from one may feed an input to another. In the system to be described, one or more video routers are used to interconnect video streams between different client endpoints.

For example, in the case where there are endpoints that span an expensive or high-delay transatlantic link, then it may make sense to minimise the 'expensive' link traffic, and in a situation where the distribution of clients and servers on either side of this link changes during the session, it may make sense to relocate the video router or equivalent components.

Before explaining the specific functionality of preferred embodiments, various scenarios to which they are applicable will be discussed with reference to FIGS. 1 to 8, which relate in general to subject matter set out in European patent application EP 13 250 048 (filed on 28 Mar. 2013 and un-published at the date of filing of the present application) and in U.S. patent application Ser. No. 14/299,036 (filed on 28 Mar. 2014 and also un-published at the date of filing of the present application). The content of these earlier patent applications is incorporated herein by reference.

FIG. 1 shows a simplified example of a topology in which two pairs of clients (C1 and C2, C3 and C4) are separated by a transatlantic link, with a video router VR located at one end of this link.

FIG. 2 illustrates the data flows which would normally be required to fully interconnect video streams between four clients C1, C2, C3 and C4 in the absence of any video routers. All of the clients are connected via a communications network which includes two normal routers R1 and R2, which are connected to each other (possibly directly, or possibly via one or more other routers), forming what may be thought of as the "back-bone" of the network. Two of the clients (C1 and C2) are connected (directly) to the back-bone of the network via router R1, and the other two (C3 and C4) are connected (directly) to the back-bone of the network via router R2.

In respect of each client device (C1, for example), there will be one outward stream for data being streamed towards each of the other client devices, and one inward stream for data being streamed from each of the other client devices. Thus, where there are N participants in total, the total number of data streams $T_c$ required to be carried on the link between one of those participating clients and its "local" or "first-hop" router will be 2(N−1), which (for a large number of participants) will be approximately 2N.

In FIG. 2 (and FIGS. 3 and 4 referred to later), as indicated by the "Key", an arrow with a number in a circle thereon symbolises a data stream from the client having that number.

It will be noted that with the topology shown in FIG. 2, the streams between C1 and C2 and the streams between C3 and C4 do not need to pass between routers R1 and R2. Only the streams between C1 or C2 and C3 or C4 need to pass between routers R1 and R2. It will therefore be evident that where there are N participants in total, the total number of data streams $T_t$ required to be carried on the link between routers R1 and R2 will be approximately $\frac{1}{2}N^2$.

If the link between the two routers is an 'expensive' link (such as a transatlantic link), the amount of data carried on it is of importance, and in the present scenario, the bandwidth required for each stream will be similar, so it becomes of importance to reduce the number of streams on the 'expensive' link.

FIG. 3 illustrates the data flows which would be required to fully interconnect video streams between all clients C1, C2, C3 and C4 when using a single video router VR.

The video router VR is able to receive one stream from each participating client and provide, as its output, one stream containing the content from each client for each other client. This generally reduces the number of data streams $T_c$ required to be carried on the link between one of those participants and its "local" or "first-hop" router to N, made up of one outgoing stream and N−1 incoming streams (clearly for large numbers of participants, and to some extent at least where the number is four or more). The number of streams required to be carried on the link between the router R1 and the video router VR, and on the (potentially 'expensive') link between the two normal routers R1 and R2 may increase quickly with the number of participants, however.

It can be seen from FIG. 3 that, as the number of clients at each end increases, the total number $T_t$ of streams required on the back-bone or transatlantic link increases by the order of $N^2$, where N is proportional to the number of clients connected (in this case, four). If each stream on the transatlantic link required approximately the same bandwidth, this would mean that the bandwidth required would therefor also increase approximately by the order of $N^2$.

FIG. 4 shows a change in topology from FIG. 3. Here, as well as video router VR1 linked to (and on the same side of the transatlantic link as) router R1, an additional video router VR2 is included, linked to router R2 at the other end of the transatlantic link. In this configuration, the total number $T_t$ of streams required on the transatlantic link (and hence the bandwidth required) over the 'expensive' link is now only proportional to N, rather than $N^2$.

If, for example the number of participants N is 10, and if the data-rate required on each transatlantic stream is 1 Mbps, the total data-rate required on the transatlantic link could be reduced from 50 Mbps to 10 Mbps by the introduction of the second video router. And if the number of participants N is 30 (and if the data-rate required on each transatlantic stream is still 1 Mbps), the total data-rate required on the transatlantic link could be reduced from 450 Mbps to 30 Mbps by the introduction of the second video router.

It will also be noted that while the bit-rates from the Internet/Backbone to each video router may remain approximately the same in total, they may be distributed over two video routers, which allows for better scalability.

This approach of reducing core network bandwidth is often described as Application-Level Multicast (ALM), and in traditional systems a change of topology such as that described above (i.e. between the FIG. 3 topology and the FIG. 4 topology) would require connections between clients and video routers to be disconnected and reconnected, thus interrupting the customer experience for a real-time communication session.

FIG. 5 illustrates how the use of proxies associated with respective users may solve the problem of such interruptions in the simplest case. In FIG. 5(a), two clients C1 and C2 are separated from each other by (but may communicate with each other via) a network X. Adding proxy devices, each of which may be a simplified video router, in two places P1 and P2 (as shown in FIG. 5(b)) does not or need not appreciably or noticeably change the experience of C1 receiving a video stream from C2 or vice versa, assuming the delays introduced by the proxies are negligible. The proxies P1 and P2 may pass the video streams through without processing them in any way (e.g. transcoding). The proxies may also be arranged to pass through any signalling and configuration information which is associated with the video streams. This may include, but is not limited to Real Time Streaming Protocol (RTSP) messages to establish and control media sessions, and RTP Control Protocol (RTCP) messages to provide out-of-band quality of service (QoS) statistics and control information. If a streaming protocol other than the Real-Time Transport Protocol (RTP) is used, then signalling and configuration information may be transmitted in other formats.

The proxies P1 and P2 essentially isolate their respective clients C1 and C2 from the network X, which may be arbitrarily complex.

At some point when multiple (other) clients (not shown in FIG. 5) are interconnected, it may become beneficial for operational reasons to change the internal topology of the network X. This reconfiguration may be to improve the service to some or all of the clients (by relocating internal elements in order to reduce delay etc.), or for internal efficiency or cost issues that do not impact directly on the clients, but which may benefit the network operator.

This reconfiguration is illustrated by FIGS. 5(c) and 5(d). The proxies P1 and P2 first create duplicates of the active streams which are traversing network X, thus creating a new, parallel set of feeds. These new feeds are transmitted over what is essentially a newly-configured network X', arriving at the far-end proxy together with the original feeds which traverse network X. The proxies P1 and P2 maintain the original stream (i.e. that via network X) to their respective clients, whilst also sending/receiving the new streams (i.e. via network X'). At some appropriate time, the proxies P1 and P2 then replace the streams to the clients from X to X', such that the clients experience no (or minimal) disruption to the video and signalling streams. Once the new X' streams are established (and preferably stable), the streams running over network X may be safely disconnected.

In order to maintain a seamless visual experience at each client, care may need to be taken in the way the proxies replace the streams to the clients from network X with those from network X'. The two streams should be identical and synchronised so that there are no discontinuities in the video stream being presented to the client. For this reason, each proxy is preferably able to match packets being received from both streams. In the case of the RTP streaming protocol, the proxy would ensure that identical sequence numbers are applied to each packet when duplicating the streams which are sent via networks X and X'. As an additional measure, if the video coding scheme in use conforms to the MPEG-4 standard (for example the H.264 codec, which is in common use), then the receiving proxy can wait for an Intra Frame (I-Frame) to appear in the streams from network X and X'. It can then switch to packets from network X' ensuring that packets sent from this stream begin with that I-Frame.

The behaviour of a proxy in respect of an incoming stream (i.e. a stream intended to be received by the client with which the proxy is associated) in the event that the two streams are not synchronised will be discussed in detail later.

The proxy module could determine packet sequence numbers and/or timestamps, and could identify I-Frames by inspecting the RTP and payload headers within each received packet. Depending on the application, a suitable algorithm could be used to ensure that the stream switch-over does not unduly affect the client. In the case of H.264 for example, the switching-induced loss of one or two packets that did not comprise part of an I-Frame would be unlikely to cause visible degradation, since the client decoder would be able to mask the loss. This would allow the proxy to be able to discard packets in order to re-synchronise streams. However in order to allow a clean switch-over, the proxy module could delay the switch-over until it has positively identified the next I-Frame.

It will be apparent that some level of overall monitoring and/or control is generally needed in this system, both to enable a decision to be taken that a change in network topology is required, and then to organise the relevant network components such that a seamless switch takes place. FIGS. 6 and 7 show an example of a simple system which incorporates such a control mechanism.

In FIG. 6, four clients C1-C4 (21-24) are distributed on either side of a transatlantic link 50, with C1 (21) and C2 (22) on one side and C3 (23) and C4 (24) on the other. All clients are isolated from the central network topology by their respective proxies P1-P4 (31-34). Consider the scenario in which C1, C2 and C3 are initially connected together, all using a central video router VR1 (41) which is located on the same side of the transatlantic link 50 as C1 and C2. Central control is provided by operation control component O (10), which has control connections to VR1 and to P1-P4.

It will be noted that the data streaming routes in use (i.e. enabling communication between C1, C2 and C3) are symbolised by thick continuous lines. Examples of these in FIG. 6 include the streaming route 60 between client C3 and its proxy P3, and the streaming route 61 between client proxy P3 and video router VR1. The control connections (i.e. between control component O and video routers VR1 and VR2, and between control component O and proxies P1-P4, are symbolised by thin dashed lines.

If new client C4 then joins the same session, control component O (10) might determine from C4's location (signalled to it via the control connection with proxy P4) that it would be more cost-efficient to start using a new video router VR2 (42) on the other side of the transatlantic link to avoid duplicating all the streams flowing to and from video router VR1 (41). This would mean that client C3's streams would need to be redirected to pass through video router VR2, so that the new topology around clients C3 and C4 would include new streaming routes 62 and 63 symbolised in FIG. 6 by the thick dotted lines.

FIGS. 7(a) and 7(b) are intended to clarify which data streaming routes would be in use before and after the switch from a topology using video router VR1 to a topology using new video router VR2. The components in FIGS. 7(a) and 7(b) are the same as those in FIG. 6, and could be numbered accordingly, but reference numerals have not been included thereon in order to keep the figures uncluttered.

In FIG. 7(a), the data streaming routes which would be in use before the switch are shown as thick continuous lines, and those yet to be established are not shown. In FIG. 7(b), the data streaming routes which would be in use after the switch are shown as thick continuous lines, and those that would be discontinued after the change are not shown.

A possible sequence of instructions from control component O to effect this change, which is illustrated in more detail by FIG. 8, might be as follows (assuming one incoming and one outgoing stream at each client):

1. C4 requests to join the session.
2. O starts up new video router VR2.
3. O requests P4 to start sending its outgoing stream from C4 to VR2.
4. O requests VR1 to send a duplicate of the outgoing streams from C1 and C2 to VR2.
5. O requests P3 to send a duplicate of its outgoing stream from C3 to VR2.
6. O requests VR2 to send the streams it is receiving from C3 and C4 to VR1.
7. O requests VR2 to send the streams it is receiving from VR1 to both P3 and P4.

8. O requests VR2 to send the stream it is receiving from P4 to P3, and the stream it is receiving from P3 to P4. The duplicate topology is now established.
9. O instructs P3 to switch the streams (originating from C1 and C2) which it is receiving from VR1 to the duplicate streams it is now receiving from VR2.
10. When the seamless switch has been successful, O instructs P3 to disconnect the streams it is receiving from VR1.

In the case that a streaming protocol such as RTP is used, then the combination of central control component O (10) and the distributed proxies P1-P4 (31-34) and video routers VR1 (41) and VR2 (42) may need to ensure that unique ports are used for the transfer of video streams and, if necessary, their associated signalling and configuration information (such as RTCP). One possible strategy would be for control component O to manage a central record of port allocation at each component. Another strategy might require each proxy or video router to maintain a local table of incoming and outgoing ports, which are each represented to control component O by an alphanumeric alias which is defined at creation time. Yet another strategy might require each component to support an appropriate session negotiation protocol in which ports are allocated in accordance with a specified algorithm.

In relation to preferred embodiments, it should be noted that the above illustrative switching sequence could be modified in practice to reduce the impact of seamless switching on the peak bandwidth demand across the transatlantic link. In the above example, a complete duplicate topology is created before any of the original links are disconnected. If multiple clients had to be switched, or multiple streams were being sent from each client to all the others, it might be more efficient to adopt a one-by-one approach, in which one duplicate stream is connected, the appropriate proxy is instructed to switch it, and the original stream is disconnected. This would be likely to result in an increase in signalling traffic, but could improve efficiency on the basis that this would occupy a fraction of the bandwidth of the video streams themselves.

It will be apparent from the discussion above that packets being transmitted across networks X and X' in FIG. 5 may experience different amounts of delay and thus arrive at the respective destination client proxies at different times. It is common practice for a client to store incoming packets in a buffer, and this approach can be used to compensate for small amounts of delay of this kind. However, this could result in different clients experiencing different amounts of delay, and in a situation according to preferred embodiments where network interconnections can be changed dynamically, there could be a greater detrimental impact on customer experience.

A simple solution to this would be to ensure that this level of delay remained consistent across all clients. It has already been explained that a central component O (10) could maintain control connections with each of the video routers and proxies, so the role of component O could be extended such that it also records measurements of delay between each of these entities. Mechanisms for measuring delay are well known in the art and include the use of RTCP, which can gather delay statistics pertaining to a specific RTP stream. If control component O were to maintain a record of delay measurements for each network interconnection which could be practically used within a communication session (including all registered clients), then it would be possible to calculate the maximum end-to-end delay between any combination of endpoints which could be expected to join such a session. In order to provide a consistent delay between all clients, the buffers receiving each incoming stream at each client could be configured to store sufficient packets such that each stream is always presented with the pre-calculated maximum end-to-end delay. This would mean that, whenever a video router configuration change was made, an additional signalling communication would be required between central component O and the or each client concerned to provide instructions about the correct buffer sizes to use. With this approach, all clients could maintain a consistent experience, even in the presence of significant differences in delay between network routes (although the delay over a particular interconnection may change over time, so central component O may need to update its calculation of the maximum end-to-end delay on a periodic basis, and to adjust the buffer settings of each client accordingly).

As will now be described, while generally using essentially the approach described above in relation to the use of proxies to switch streams when a topology change is desired or required while streamed communication is taking place, preferred embodiments of the invention adopt a different approach to dealing with differences in delay. This approach primarily involves a change to the functionality of a proxy in respect of a stream intended to be received by the user with which the proxy is associated, allowing the proxy to deal with differences in delay not just over the same route at different times, but over two different routes, one of which is being used prior to a switch and the other of which is to be used after the switch, in such a way as to mask these from the user without adding lasting delay.

Switching Between Streams on Paths Having Differing Delay

In most situations involving one-directional visual or audio communication (e.g. online video streaming, or live streaming of content such as a football match), a small amount of delay is generally not of great importance, partly because a user generally has no accurate concept of what "live" is. In such cases, the user is unlikely to notice or be adversely affected even if their stream is delayed by as much as several seconds behind "real-time" (although a user may well notice sudden jumps or drop-outs, even if these are only of a fraction of a second).

In other situations such as multi-party video calling or the transmission of rapidly changing real time data, it may be beneficial to reduce the delay as much as possible. A delay of more than a couple of hundred milliseconds may make even a two-way video call difficult for the participants. The problem may be compounded if there are several participants; each may experience a slightly different delay owing to their network routing, or even to local processing capabilities.

As explained earlier, in traditional multi-party audio and video sessions, client or server nodes may be added or removed but in general the network routing is not fundamentally changed during the duration of a communication session. The technique described above allows the network topology to be changed in real time which can improve user experience. While the technique as described above can allow for seamless switching between two streams to be performed, for this, it generally requires the two streams to be perfectly synchronised. If they are not, this can be achieved by adding artificial delay to every path (except the slowest) in order to increase its delay to that of the slowest path. This leads however to every path being equally affected in terms of delay, so while switching between different network topologies using the technique described above may improve efficiency or reduce bandwidth usage over a particular network link, it will not reduce the delay that users experience. Further, it does not provide a way to switch seamlessly from a faster or less-delayed connection to a slower or more delayed one, unless an adequate buffer of artificial delay is already present, which itself worsens user experience.

Preferred embodiments such as those described below allow for switching to be performed between non-synchronised streams without needing to add extra artificial or lasting delay to any connection. They allow the resilience and efficiency benefits that being able to switch between different network topologies can provide, while still allowing seamless switching to be performed even between network topologies of differing delay. As will be understood, preferred embodiments achieve this by subtly changing the playback speed of a currently-playing stream (video and/or audio, or otherwise) to a faster speed in order to 'catch up' in order to allow seamless switching to a "less-delayed" stream, or by subtly changing the playback speed to a slower speed to 'lag behind' in order to allow seamless switching to a slower or "more-delayed" stream. The length of time taken to perform such switching may be set according to personal choice—switching operations where the playback speed is only adjusted slightly and/or is only adjusted gradually are generally less noticeable or even unnoticeable to humans, but may take a longer time to complete.

As indicated above, maintaining a seamless video and/or audio stream is usually important for the best user experience. Sometimes (e.g. when watching a video online) it is acceptable to add some delay (e.g. by 'buffering' a few seconds of content) in order to provide greater resilience to small stutters in the connection. However, in other cases, for example in a two-way or multi-party video call, it is also desirable to minimise delay between clients where possible. The following describes how seamless switching techniques such as those described in detail can be used in conjunction with 'speed adjustment' of the streamed content during (i.e. and/or shortly before and/or shortly after) the switch to achieve a visually and/or audibly seamless switch between two paths or network configurations of differing delay that does not compromise the experience of the communication by adding any lasting artificial delay to either of the networks. (As will become apparent, this may be done by introducing a small temporary delay during the duration of the switching process, but even during this temporary period the delay that the user experiences will never be worse than that of the poorer connection).

Figure 9:
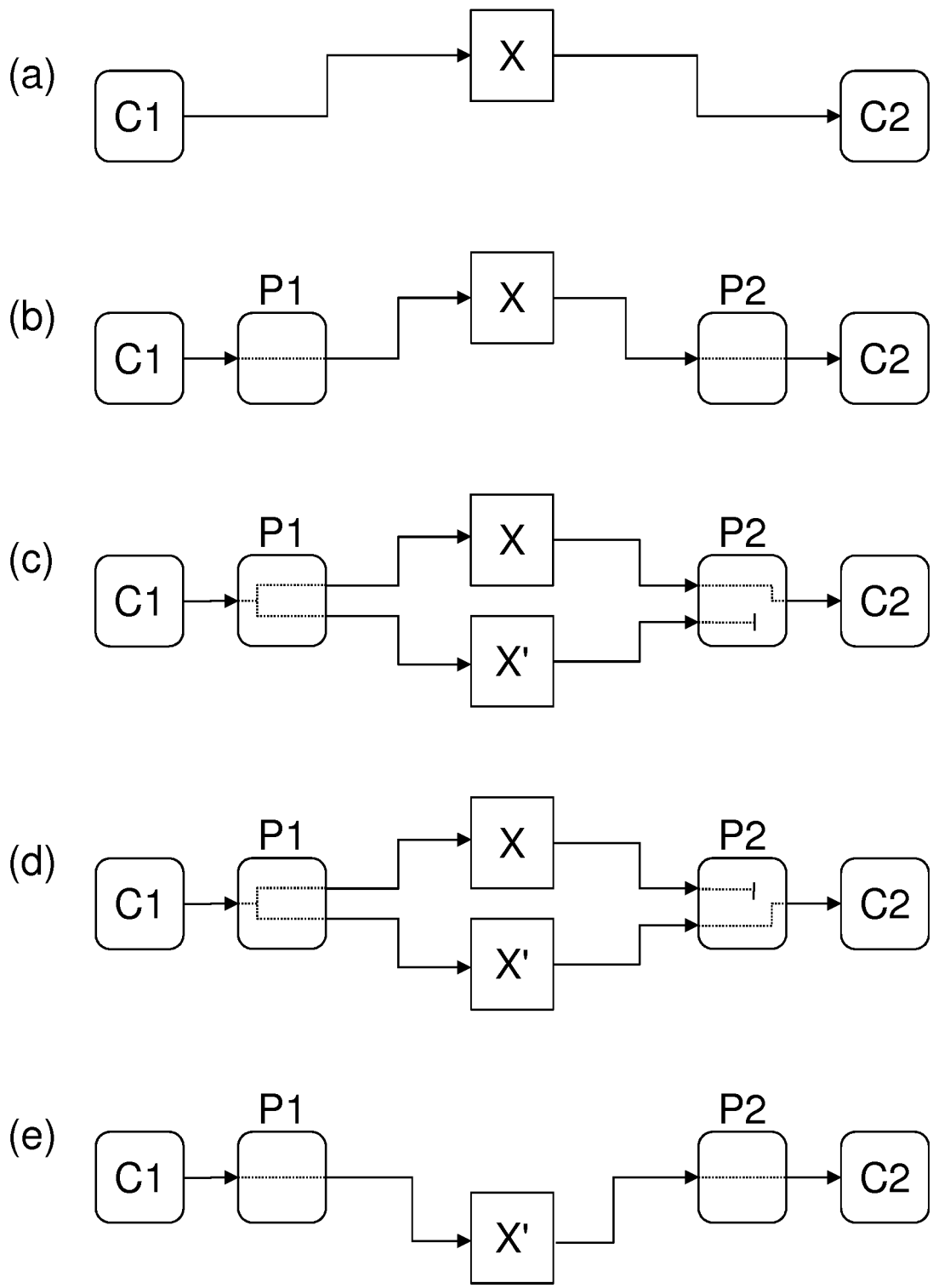
FIG. 9 illustrates the stages generally involved when proxies are used to switch between two corresponding data streams, in particular where the streams arrive at the receiving proxies having been equally delayed and/or in synchronisation with each other.
Figure 10:
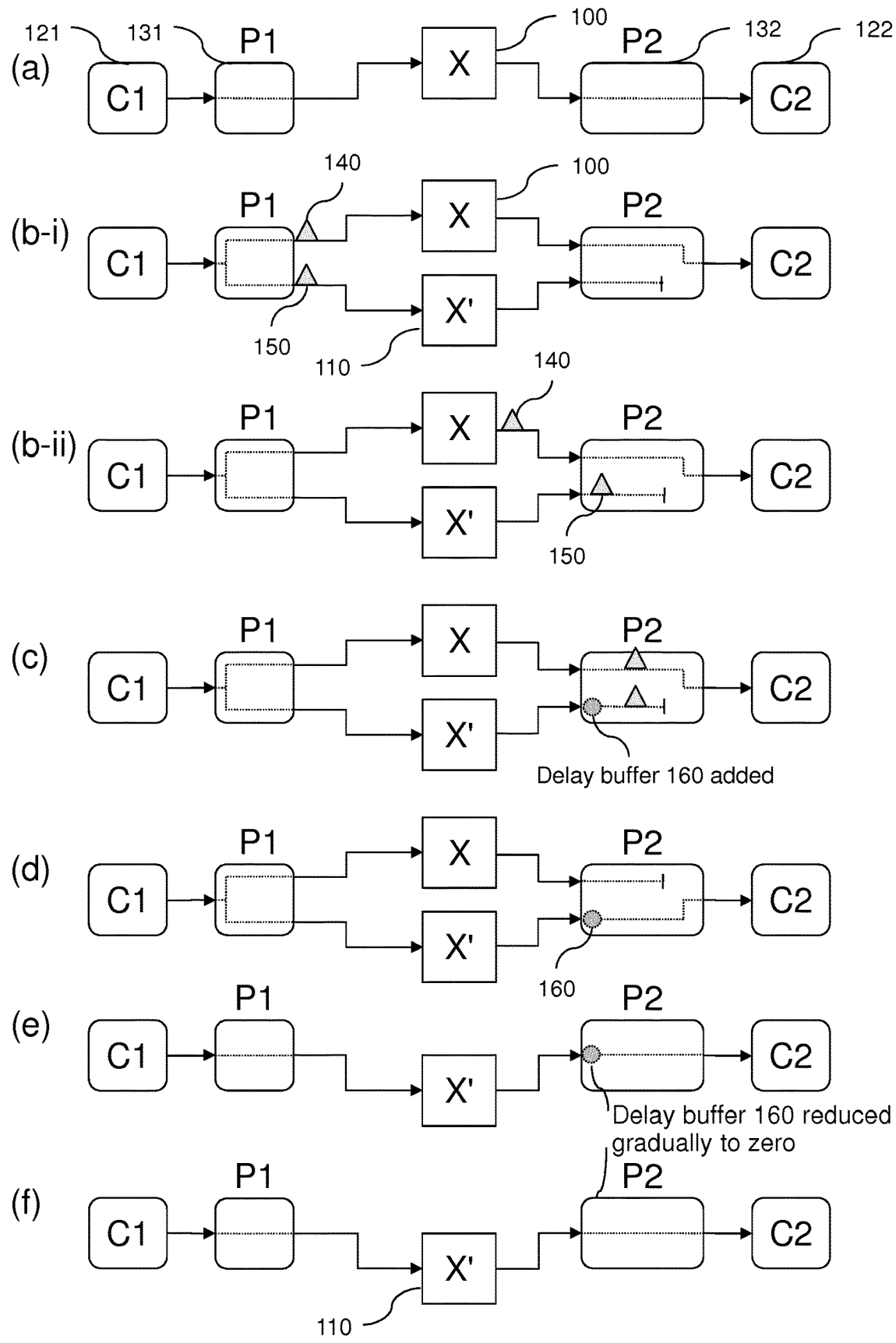
FIG. 10 illustrates the stages involved in a method according to a preferred embodiment in which proxies are used to switch between two corresponding data streams, in a situation where switching is from a stream with a longer delay to a stream with a shorter delay.
Figure 11:
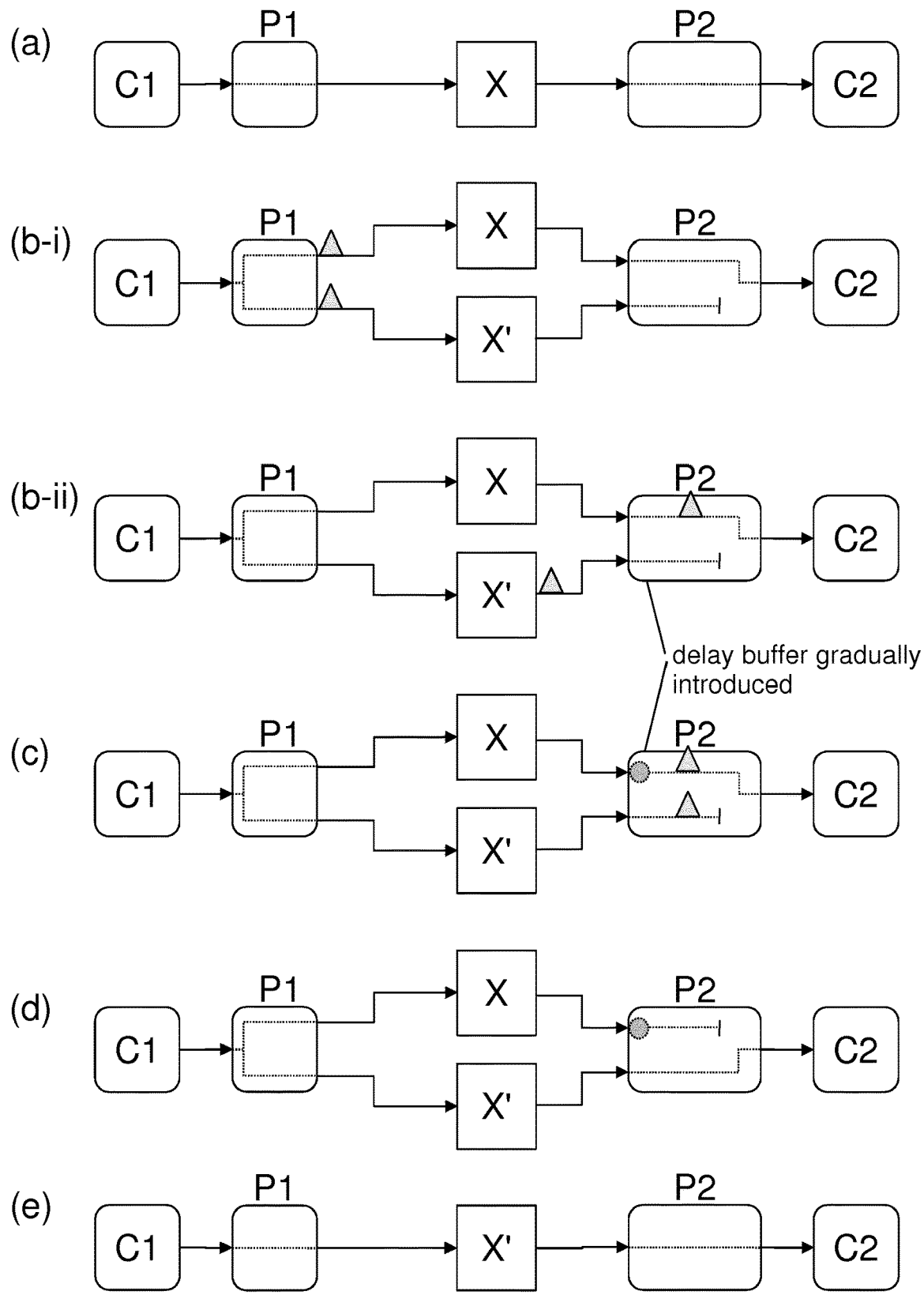
FIG. 11 illustrates the stages involved in a method according to a preferred embodiment in which proxies are used to switch between two corresponding data streams, in a situation where switching is from a stream with a shorter delay to a stream with a longer delay.

FIGS. 9, 10, 11 and 12 illustrate how preferred embodiments solve this problem with reference to a simple scenario: two clients (C1 and C2), initially in communication with each other via a first network configuration (X) (see FIG. 9(a)) which undergoes a topology change to become a second network configuration (X') (see FIG. 9(e)). FIGS. 9(b) to 9(e) illustrate the use of proxies to solve the general problem of how to switch the route or network configuration via which streamed data travels from a sender to a receiver, and will also be used to illustrate the stages generally involved when proxies are used to switch between two corresponding data streams where the streams arrive at the receiving proxies having been equally delayed and/or in synchronisation with each other. FIGS. 10 and 11 will be used to illustrate cases where the streams arrive at a receiving proxy having been delayed by different amounts and/or not in synchronisation with each other.

In the context of multi-party video-conferencing, there would of course generally be other clients, and streams would in general be travelling in each direction between the respective clients, as illustrated in FIGS. 1 to 4 and FIGS. 6 and 7, for example (which are all scenarios in respect of which embodiments of the present invention may be applicable), but for the purposes of providing a clear explanation of the behaviour of a proxy acting on behalf of a client receiving streamed data from another client, the functionality of the "receiving" proxy will generally be described below with reference just to the streamed data from one client (C1) to one other client (C2) of the plurality of clients that may be involved overall.

Adding a simplified Video Router as a proxy in two places (P1 and P2) does not generally change the experience of client C2 receiving a video stream from client C1 or vice versa, assuming the delays introduced by the proxies are negligible (see FIG. 9(b)). The proxies may pass the video streams through without processing them in any way (e.g. transcoding). The proxies are also arranged to pass through any signalling and configuration information which is associated with the video streams. As before, this may include (but is not limited to) RTSP messages to establish and control media sessions, and RTCP messages to provide out-of-band quality of service statistics and control information. If a streaming protocol other than RTP is used, then signalling and configuration information may be transmitted in other formats, or be sent via other routes.

The proxies P1 and P2 isolate the clients C1 and C2 from the network X, which may be arbitrarily complex. At some point when multiple clients (not shown in FIG. 9) are interconnected, it may become beneficial (for operational reasons such as those discussed with reference to FIGS. 1 to 7) to change the internal topology of network X. This reconfiguration may be to improve the service to some or all of the clients (by relocating internal elements in order to reduce delay etc.), or for internal efficiency or cost issues that do not impact directly on the clients, but which may benefit the network operator.

This is illustrated in FIG. 9(c). The proxies first create duplicates of the active streams which are traversing network X (one from each client in respect of each other client, for example), thus creating a new, parallel set of streams. These new streams are transmitted over a newly-configured network X', and generally arrive at the far-end proxy at the same or approximately the same time as the original streams which traverse network X. The proxies maintain the original X stream to the clients, whilst also receiving the new streams X'.

The far-end or "receiving" proxy now examines the content of (or markings in respect of) the streams to determine whether they are synchronised or not. If they are synchronised (i.e. in the case where X and X' are introducing equal amounts of delay into the streams), or if synchronisation is unimportant for the particular use case, then the switch can be made immediately. In the general case, however, the data traversing the arbitrarily complex networks X and X' will be delayed by different amounts of time, say by D and D'. By comparing the two streams, the far-end proxy can determine the difference in delay, Δ, between two corresponding streams. This comparison can be carried out in a variety of ways. One simple and efficient way is by checking the sequence numbers of packets incoming on the two identical (or near-identical) streams. (The near-end proxy should of course apply identical sequence numbers to each packet sent over X and X' when duplicating the stream from the sending client.) Another way would involve checking the streams for corresponding content or for marks (e.g. electronic "water-marks") included in the streams for this particular purpose or otherwise. This comparison should not add more than a negligible amount of delay on capable hardware.

There are now three cases to consider:
1. The delays in the two networks are identical or almost identical;
2. The new network X' introduces less delay than the original network X (D'<D);
3. The new network X' introduces more delay than the original network X (D'>D).

In the latter two cases, preferred embodiments make use of a buffer to add a suitable amount of delay into (at least) one of the streams while the switch takes place.

In the first case, illustrated by FIG. 9 (i.e. when D and D' are equal), the far-end proxy should observe a Δ of zero (or practically zero) time. In this case, a seamless switch between the two identical and synchronised streams can be carried out without adding a delay to either stream, as shown in FIG. 9(d). After the switching of streams has taken place, the stream through network X can be stopped or dismantled (see FIG. 9(e)).

In the second case, illustrated by FIG. 10, switching will be from a stream received via a network X with a longer delay to a stream received via network X' having a shorter delay. The switching process for this situation will be described with reference to a single uni-directional stream from sending client C1 (121) having associated proxy P1 (131) to receiving client C2 (122) having associated proxy P2 (132), starting from a point at which the stream travels between proxies P1 and P2 via network topology X (100), as shown in FIG. 10(a). Once a second stream has been established travelling between proxies P1 and P2 via new network topology X' (110), the far-end proxy observes that identical or corresponding packets (or other marks), sent over both networks by the near end proxy at the same time, do not arrive "in sync". This is illustrated by FIGS. 10(b-i) and 10(b-ii), in which the triangles 140, 150 represent respective instances of identical packets moving through the networks via respective paths. They leave the sending proxy P1 at the same time (FIG. 10(b-i)), but arrive at different times at the receiving proxy P2 (FIG. 10(b-ii)), with the packet 150 that has traversed X' arriving first. In this case the receiving proxy P2 should prepare to buffer the stream from X' to add a time delay of A to it (see FIG. 10(c)). With delay buffer 160 of size Δ included in the stream via X', packets are then synchronised (i.e. after all the packets coming through X' have been delayed by the buffer 160 at proxy P2). This buffer 160 can be introduced instantly, as this stream from X' is not yet being sent to the client C2, so any visual effects such as stuttering which suddenly introducing such a buffer might cause are unimportant in this case. A seamless switch can now be carried out between X and the buffered X' (FIG. 10(d)).

After the switch has occurred, the original stream through network X can be dismantled (FIG. 10(e)).

Also after the switch has occurred, the size of the buffer 160 on X' may be gradually reduced down to zero, thereby reducing the delay to take advantage of the lower latency of network X'. During the process of reducing the buffer, the client will receive a stream that may appear to be sped up or speeding up, but if the reduction of the buffer is done sufficiently gradually, this may not actually be noticeable to the user. Once the buffer delay reaches zero the stream will be purely X' with no buffer (i.e. no added delay), and back to normal speed (FIG. 10(f)).

In the third case, illustrated by FIG. 11, the switching will be from a stream received via network X (100) with a shorter delay to a stream received via network X' (110) with a longer delay. (NB Reference numerals corresponding to those used in FIG. 10 could be used, but have not been in order to avoid unnecessarily cluttering the figure and associated text.)

As before, the switching process will be described with reference to a single stream from sending client C1 having associated proxy P1 to receiving client C2 having associated proxy P2, starting from a point at which the stream travels between proxies P1 and P2 via network topology X, as shown in FIG. 11(a). Once a second stream has been established travelling between proxies P1 and P2 via network topology X', the far end proxy (P2) observes that packets received that have passed through X arrive at some time interval Δ before their duplicates that have traversed X'. This is shown schematically in FIGS. 11(b-i) and 11(b-ii), in which the triangles again represent duplicate packets. Before switching, a buffer is therefore introduced on the connection from network X so that the two streams are synchronised. As the client C2 will currently be receiving the stream from network X, this buffer (or the delay caused by it) should be increased gradually to the target of Δ rather than all at once. While the buffer is being increased, the client may receive a stream that appears to be slowed or slowing down, but if the increasing of the buffer is done sufficiently gradually, this may not actually be noticeable to the user. When the time buffer of Δ is reached, proxy P2 stops increasing the size of the buffer, and the two streams (the buffered instance via X, and the un-buffered instance via X') are now synchronised and at normal speed (FIG. 11(c)). The seamless switch can then be made onto stream X' (FIG. 11(d)). The original stream through network X can then be stopped or dismantled, as shown in FIG. 11(e).

In all three cases, once the receiving proxy P2 is ready for the switch to take place; in theory the switch could be made at any time, as the packets should be arriving at the far-end proxy perfectly synchronised and in pairs from the two networks X and X' (with the buffer delay included if necessary). However in real-world conditions, jitter is experienced so it is usually unlikely that packets will arrive perfectly synchronised and in pairs. For additional robustness there may be certain stages in the stream at which it is better to switch. For instance, if the video coding scheme in use conforms to the MPEG-4 standard (for example the H.264 codec, which is in common use) then it may be appropriate for the receiving proxy to wait for an Intra Frame (I-Frame) to appear in the streams, and switch to network X' at that precise moment such that the packets sent to the client from stream X' begin with that I-Frame. This can provide additional robustness, ensuring that even in the event that the streams become slightly desynchronised just as the switch is taking place, the video will still be valid and playback errors can be minimised.

In these examples, P2 is described as the "receiving" proxy, but in general, P2 may also be acting as a sending proxy, P1 may also be acting as a receiving proxy in respect of data streaming in the opposite direction, and other proxies would also generally be acting as sending and/or receiving proxies in respect of other clients in a multi-party session.

Figure 12:
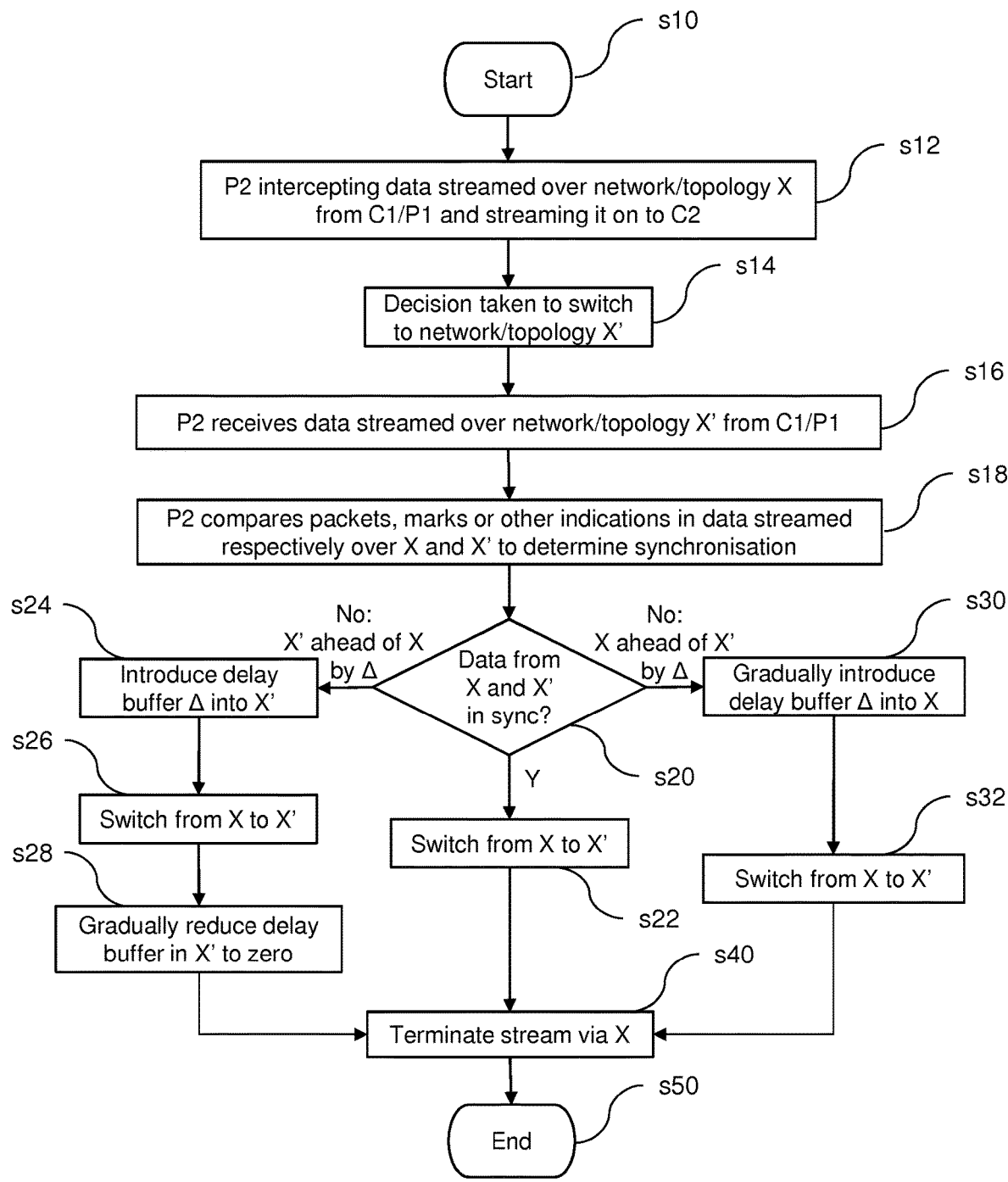
FIG. 12 shows possible steps that may be carried out by a proxy module in respect of incoming streams when implementing a method according to a preferred embodiment.

Referring now to FIG. 12, this is a flow-chart illustrating steps that may be performed by a proxy module P2 acting on behalf of a client C2 receiving streamed data from one or more remote client devices, showing in particular how such a proxy module may act in each of the three cases discussed respectively with reference to FIGS. 9, 10 and 11 in response to a determination that a network topology change affecting streamed data destined for client C2 is to be made. For simplicity, this flow-chart only illustrates the functionality performed by proxy module P2 in respect of 'incoming' streamed data intended for its client device C2 from one other client device C1, which proxy module P2 intercepts from proxy module P1 acting on behalf of device C1. As previously explained, proxy module P2 would generally also be intercepting streamed data from other client devices as well, and may also be intercepting 'outgoing' streamed data from its client device C2 that is destined for client device C1 and other remote client devices.

Starting from step s10, prior to any network topology change, P2 intercepts data streamed over network topology X from client C1 (via proxy P1), and streams it on to client device C2 (step s12). At step s14, a decision is taken to switch to network topology X'. This decision may be taken by an operation control component O (10) such as that referred to in relation to FIGS. 6 and 7, by the proxy modules P1 or P2 themselves, or otherwise.

An additional media stream (and any required signalling) is then established via network topology X'. Proxy module P2 will then be receiving data streamed from C1/P1 over both network topologies X and X' (step s16).

Proxy module P2 is now able to compare the respective instances of the streamed data via the two network topologies (step s18) in order to determine whether they are in synchronisation or not (step s20), and if not, to determine which instance is being received first and the difference A in delay between the two. As explained earlier, it can do this by inspecting packets, packet sequence numbers, marks such as time-stamps or other indications in data streamed respectively over X and X'. Depending on the results of this comparison, the switching process proceeds in one of three different ways.

If it is found at step s20 that the delays in the two networks X and X' are identical, almost identical, or below a threshold amount, there is generally no need to introduce a delay into either instance, so the process proceeds via step s22, with proxy module P2 switching as soon as possible or at a convenient time from forwarding data received via X to forwarding data received via X'. Once the switch has been made, the original stream received via X can be terminated (step s40) and the switching process can end (step s50).

If it is found at step s20 that the new network X' is introducing less delay than the original network X, the process proceeds via step s24, in which proxy module P2 introduces a delay buffer of size Δ into the instance received via X' in order to counteract the difference in delay. Proxy module P2 can then switch seamlessly from forwarding data received via X to forwarding data received via X' (step s26). Once the switch has been made, the delay buffer in the instance received via X' can be reduced to zero, ideally sufficiently gradually for the change not to be noticeable to a user of client C2 viewing the streamed data. As before, the original stream received via X can be terminated (step s40) and the switching process can end (step s50). The original stream received via X can in fact be terminated as soon as the switch has been made at step s26 (i.e. before step s28) as it is not being forwarded to client C2 any longer—this may be appropriate in order not to continue using network resources in topology X any longer than is necessary.

If it is found at step s20 that new network X' is introducing more delay than original network X, the process proceeds via step s30, in which proxy module P2 introduces a delay buffer of size Δ into the instance received via X in order to counteract the difference in delay. Proxy module P2 can then switch seamlessly from forwarding data received via X to forwarding data received via X' (step s32). Once the switch has been made, the original stream received via X can be terminated (step s40) and the switching process can end (step s50).

It is worth noting that the corresponding "parallel" streams or instances need not be identical, or carry precisely the same version of the content to which they relate. In the case of video content, the different instances may in fact be different views or angles of the same content, or different resolution versions of the same content, for example. Similar possibilities may arise in the case of audio content. While such different versions of the same content may still be capable of being synchronised or not, it may be difficult in some cases for a proxy module to determine synchronisation or lack of it by inspecting the content, but in such cases, it may be appropriate to determine this by looking at markers, etc., as discussed above.

Where there is a difference in delay between the two networks as in case 2 (or case 3), there is generally a trade-off to be made concerning the rate at which the delay on the buffer is decreasing (or increasing), and how noticeable the visual effect of the video being played at an increased (or reduced) speed may be.

Figure 13:
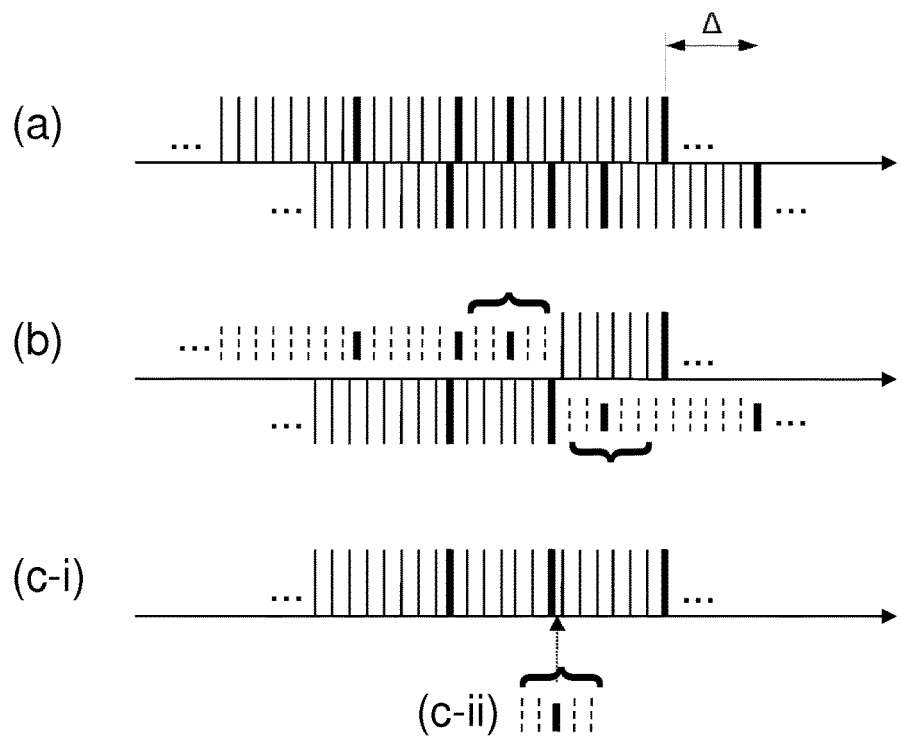
FIGS. 13 and 14 illustrate how switching between video streams which are not synchronised on receipt at a receiving proxy without using buffering can lead to a segment of video being skipped or repeated.
Figure 14:
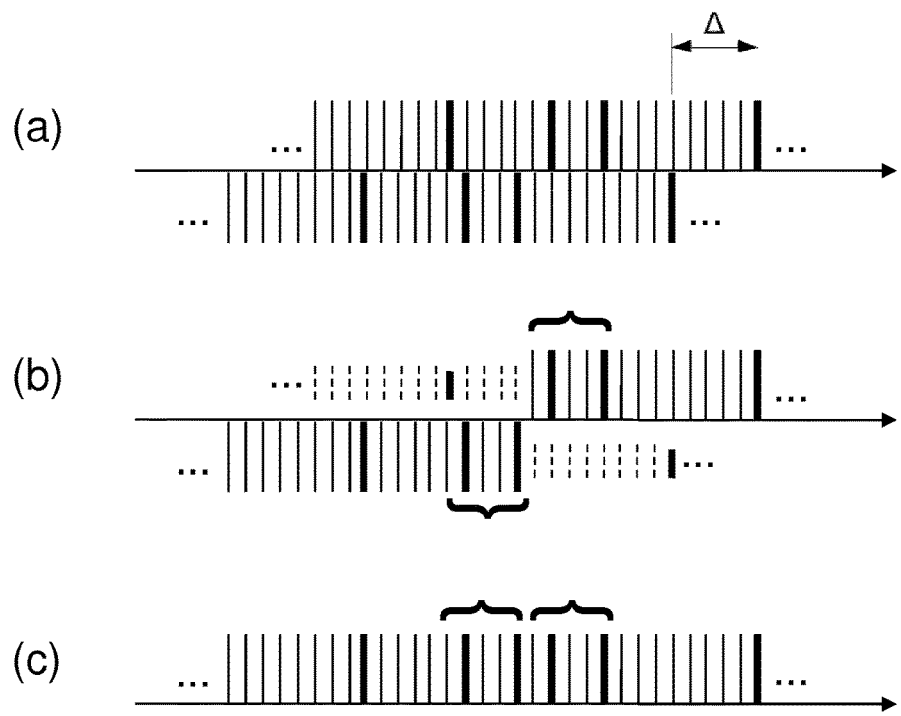

The use of the variable-delay buffer enables the effect of switching between stream X and X' to be spread out. With no buffering, the effect of switching would generally be to skip out (or repeat) a segment of video of length Δ. This is illustrated by FIGS. 13 and 14 respectively. In these, the frames of video are represented by vertical lines travelling to the right. Bold vertical lines are used here to represent I-Frames, which may be better to switch on for the reasons discussed above, and are also used in order to add clarity to the diagram by enabling a reader to see the offset between the two streams more easily. In the case of non-video streams or streams of some video format without I-Frames, all the vertical lines could simply represent packets or frames.

FIG. 13(a) shows two identical video streams—an original stream (top) and a new stream (bottom) offset by some time interval Δ. The original stream is behind the new stream by Δ. FIG. 13(b) shows how the receiving end proxy could perform a switch from the original stream to the new stream. The black frames are sent to the receiving client, and the frames shown as shorter, greyed-out and dashed lines are frames that are not sent to the client. Note that the switch has been made on an I-Frame occurring on the new stream. However, because the new stream is ahead of the original, there is a section of length Δ that is never sent to the client. In the illustration, this section is the five frames marked by the curly braces. FIG. 13(c-i) shows the stream that the client would receive in this situation, with the missing portion and its location in the stream being indicated in FIG. 13(c-ii).

In FIG. 14(a) the original stream (top) is ahead of the new stream (bottom) by some time interval Δ. FIG. 14(b) shows how the receiving-end proxy could perform a switch from the original stream to the new stream in the same way as before. Again, the switch has been made on an I-Frame occurring on the new stream. Because the new stream is behind the original, there is a section of length Δ that is sent to the client twice. In the illustration, this section is the five frames marked by the curly braces. FIG. 14(c) shows the stream that the client would receive in this situation, with the duplicated portion marked by curly braces.

Figure 15:
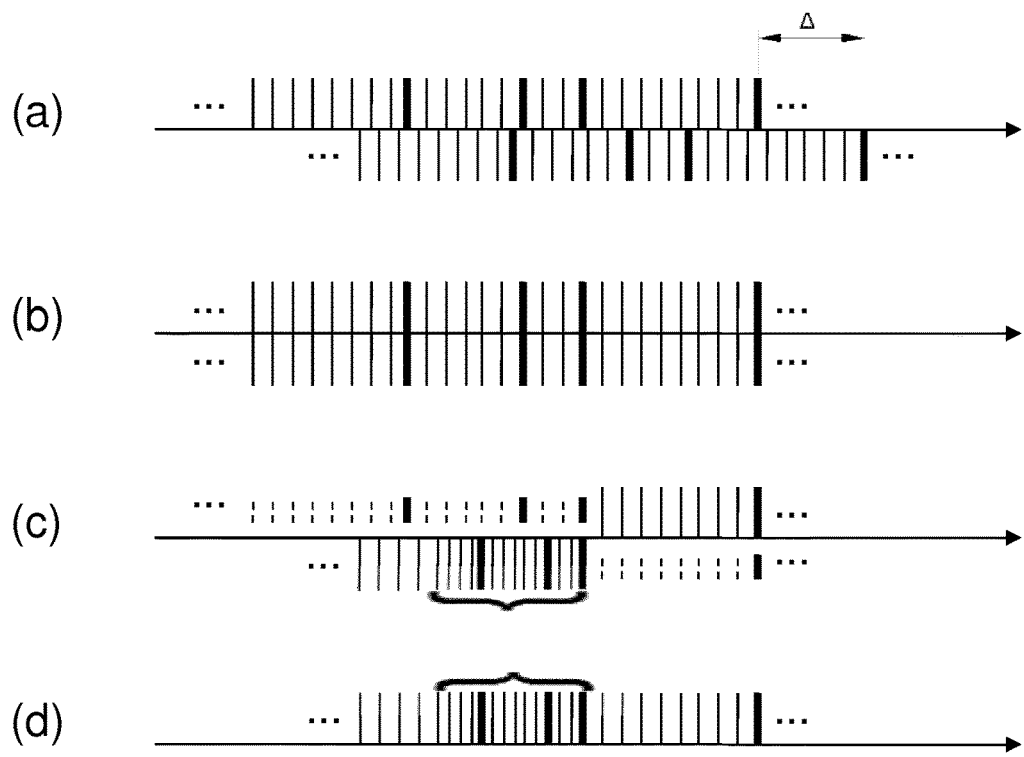
FIGS. 15 and 16 illustrate how a receiving proxy can use a technique according to a preferred embodiment to make a seamless switch on the stream received by the client.
Figure 16:
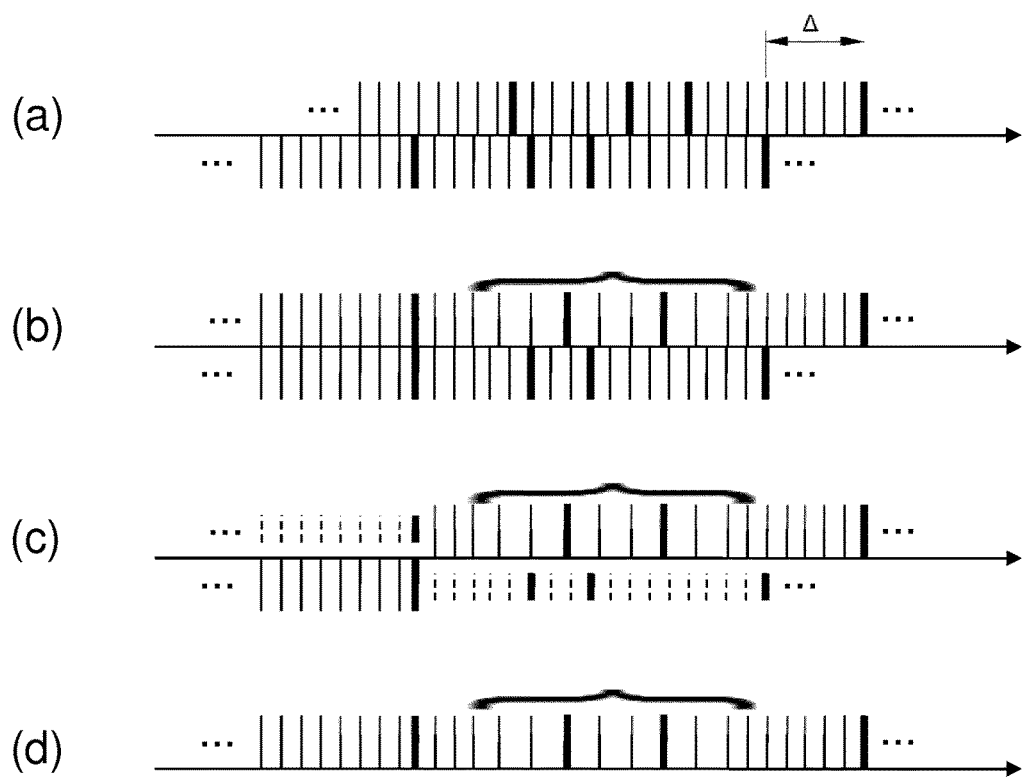

The buffer serves to spread out this sharp effect by speeding up or slowing down the video for a period of time, generally leading up to or starting from the time of the switch (i.e. depending on whether the new stream is ahead of or behind the old stream). If the video is only adjusted slightly or gradually in speed then the effect will be less noticeable but will take longer. By contrast if the video is altered in speed sharply or by a larger amount then it may be more noticeable, but can be over a shorter period of time. By choosing a sufficiently small change of speed it should be possible to perform the switch in such a way that a human observer may be entirely unaware that any time distortion has occurred. FIGS. 15 and 16 illustrate the effect of using time distortion to make a seamless switch on the stream received by the client.

In FIG. 15(a), as in FIG. 13(a), the new stream (bottom) is ahead of the original stream (top) by a time interval Δ. FIG. 15(b) shows how an artificial delay of Δ can be added to the new stream in order to synchronise it to the original stream. In FIG. 15(c), a switch is made onto the new stream on an I-Frame, and then the new stream is sped up for a period of time in order to gradually reduce this artificial delay back to 0. This period of time is indicated by the curly brace, and during this time the stream is sent to the client at a faster rate. FIG. 15(d) shows the stream that the client would receive in such a situation. No frames are missing this time, but for the period of time under the curly brace the packets are received at an increased rate, and so the video may appear to play slightly faster during this period.

In FIG. 16(a), as in FIG. 14(a), the new stream (bottom) is behind the original stream (top) by a time interval L. FIG. 16(b) shows how gradually introducing a buffer over a period of time (marked by the curly brace) can be used to add an artificial delay of Δ to the original stream and synchronise it with the new stream. During this period the frame rate of the stream is reduced. In FIG. 16(c), a switch is made onto the new stream on the first I-Frame occurring after synchronisation. FIG. 16(d) shows the stream that the client would receive in such a situation. No frames are missing, but for the period of time under the curly brace the packets are received at a decreased rate, and so the video may appear to play slightly slower during this period.

As an example, say two users in Europe are having a video call which is being routed through some video server in the US. This route involves crossing the Atlantic twice, and is probably sub-optimal, so a decision may be taken to re-route the call via some video server in Europe instead. In such a situation, the clients might experience an end-to-end delay of 250 ms using the original streams via the US server, but only 50 ms on the new streams via the European server; a 200 ms reduction in latency. To switch onto the new stream using the described method, 200 ms of artificial delay should be added to the new stream before the switch in order to synchronise the streams and make the switch as seamless as possible. Then, after the switch has occurred, this artificial delay should be gradually reduced to zero over some period of time, so that the users can benefit from the lower latency of the European link. If the delay is reduced over a long-enough period of time, then it will be hardly noticeable to the humans at each end.

If the artificial delay is gradually reduced from 200 ms to 0 ms over a period of 5 seconds; the effect of this is to squeeze 5200 ms of video into 5000 ms of time—i.e. playing the video at 1.04× speed—a speed increase of only 4% during these 5 seconds.

Going the other way, if the call was reconfigured to use the US router again (perhaps in response to several US clients joining, or some other factor), then 200 ms of delay would need to be gradually introduced before the switch could be made. If an artificial delay buffer were gradually increased from 0 ms to 200 ms over 5 seconds again, then this would have the effect of stretching 4800 ms of video into 5000 ms of time—giving a playback speed of 0.96×, a reduction of 4% for the period of 5 seconds.

If acceptable target speeds (e.g. a 'fast playback speed' of 1.04 and a 'slow playback speed' of 0.96) are known then, for a given delay "delta" between two network topologies, it is a simple matter to calculate the period of time over which the time distortion should be made in order to obtain or remain within these speeds of playback. The optimum speeds probably depend on the situation—closer to 1× the speed adjustment should be less noticeable but take a longer time to complete, whereas further from 1× the speed adjustment is more severe but lasts for a shorter period of time.

More generally, with embodiments such as those described earlier and others, it will be understood that there is often a trade-off between duration of the time-stretching or time-compression phase and the 'aggressiveness' of the rate adjustment of the streaming of data (i.e. the duration may be long, with the rate only being adjusted slightly, or may be short, with a more noticeable rate change). For example, if it is necessary for one instance to "catch up" the other to counteract a difference of 200 ms, it would be possible to do this (a) by doubling play-speed for a duration of 200 ms (of real time); (b) by playing back at 120% speed for 1 second; (c) by playing back at 104% speed for 5 seconds; or using other speed-change profiles. The appropriate speed-change profile may depend on a variety of factors including the type of streaming itself.

For example, in the case of video (and/or audio) streaming, a less-aggressive speed adjustment and therefore a longer switch might be better, so that the switch is less noticeable to the human eye (and/or ear).

In the case of computer-gaming, however, when switching to a stream of lower delay, it might be preferable for a more aggressive speed adjustment to be used so that the switch is over sooner and so that the user and/or the user's device and/or application can benefit from the lowest latency as soon as possible. The time-compressed switch may still be preferable to an instantaneous switch with no rate adjustment, as with an instantaneous switch, packets may be dropped or repeated (and possibly confuse the gaming device and/or application). In such a case, the rate could be set to be the most aggressive rate that wouldn't 'overload' the client by passing through too much data at once (possibly dependent on the specs of the client device and/or application in use).

Also, while a longer overall switching operation generally allows for visual or other effects to be made less noticeable, increasing the amount of time for which streaming is happening via both network topologies involves using additional network resources for longer than may be necessary, so if the overall usage of network resources is an important issue, it may in some cases not be appropriate to spread the overall switching operation out over a longer period.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of managing streamed communication between a client device and one or more of a plurality of remote devices via a digital data communication network, the data communication network comprising a plurality of routers, the method comprising, at a proxy module functionally associated with the client device:
   receiving a first audio and/or video content stream from at least one of said routers, and streaming said first stream to the client device, said first stream having traversed a path through a first set of said routers prior to being received by the proxy module;
   receiving from at least one of said routers a second audio and/or video content stream that is identical or nearly identical to the first stream while still receiving the first stream, the second stream having traversed a path through a second set of said routers that is different from the first set of said routers prior to being received by the proxy module, the second stream having been instantiated in response to a network topology change during the streaming of said first stream to the client, the network topology change being:
      caused by a change in the number, identities and/or locations of one or more of the remote devices; and/or
      triggered in response to a change in network conditions, and;
   comparing the first and second streams to determine a discrepancy measure indicative of whether the first and second streams are synchronised with each other, and if not, introducing a delay into one or other of said streams to decrease or remove any discrepancy in synchronisation between the respective streams; then
   switching from streaming the first stream to the client device, to streaming the second stream to the client device;
   wherein the step of comparing comprises determining whether one or more elements of the second stream have arrived at the proxy module before or after one or more corresponding elements of the first stream, and if before, introducing a delay into the second stream prior to said switching then gradually decreasing said delay after said switching; and if after, gradually introducing a delay into the first stream prior to said switching.

2. The method according to claim 1, wherein the second stream is instantiated in response to an indication that the audio and/or video content of the fist stream is to be received from a different router.

3. The method according to claim 1, wherein the first and second streams are received by the proxy module from different routers.

4. The method according to claim 1, wherein the discrepancy measure determined in the comparing step is a measure indicative of whether the first and second streams are synchronised with each other on receipt at the proxy module.

5. The method according to claim 1, wherein the discrepancy measure determined in the comparing step is a measure indicative of respective times of receipt at the proxy module of corresponding elements of the first and second streams.

6. The method according to claim 1, wherein the switching is performed at a time dependent on the audio and/or video content of the first and/or second streams.

7. The method according to claim 1, wherein in the event of a determination that said one or more elements of the second stream have arrived at the proxy module before said one or more corresponding elements of the first stream, the delay introduced into the second stream prior to switching is decreased to zero after said switching according to a profile dependent on a user requirement.

8. The method according to claim 1, wherein in the event of a determination that said one or more elements of the second stream have arrived at the proxy module after said one or more corresponding elements of the first stream, the delay introduced into the first stream prior to switching is introduced according to a profile dependent on a user requirement.

9. The method according to claim 1, the method further comprising a step of terminating the first stream after said switching has been performed.

10. A computer device, including a computer hardware processor, configured to execute instructions of a proxy module for managing streamed communication to a client device from one or more of a plurality of remote devices via a digital data communication network, the data communication network comprising a plurality of routers, the proxy module being associated with the client device, and the computer device being configured, upon execution of the instructions of the proxy module by the computer hardware processor, to at least perform:
   receiving a first audio and/or video content stream from at least one of said routers, and streaming said first stream to the client device, said first stream having traversed a path through a first set of said routers prior to being received by the proxy module;
   receiving from at least one of said routers a second audio and/or video content stream that is identical or nearly identical to the first stream while still receiving the first stream, the second stream having traversed a path through a second set of said routers that is different from the first set of said routers prior to being received by the proxy module, the second stream having been instantiated in response to a network topology change during the streaming of said first stream to the client, the network topology change being:
      caused by a change in the number, identities and/or locations of one or more of the remote devices; and/or
      triggered in response to a change in network conditions, and;
   comparing the first and second streams to determine a discrepancy measure indicative of whether the first and second streams are synchronised with each other, and if not, introducing a delay into one or other of said streams to decrease or remove any discrepancy in synchronisation between the respective streams; then
   switching from streaming the first stream to the client device, to streaming the second stream to the client device;
   wherein said comparing comprises determining whether one or more elements of the second stream have arrived at the proxy module before or after one or more corresponding elements of the first stream, and if before, introducing a delay into the second stream prior to said switching then gradually decreasing said delay after said switching; and if after, gradually introducing a delay into the first stream prior to said switching.

11. A system for managing streamed communication between a plurality of client devices via a digital data communication network, the data communication network comprising a plurality of routers, the system comprising:

a plurality of proxy modules and a plurality of computer hardware processors which respectively execute instructions of the plurality of proxy modules, each proxy module being functionally associated with a client device; and a control system, including computer hardware for executing instructions such that the control system is configured to determine whether data being streamed between one client device and another client device along a path through a first set of said routers should be streamed along a path through a second set of the routers that is different from the first set of the routers, and if so, to issue a routing-change indication in respect of such a determination;

each proxy module being configured to, upon execution by its respective computer hardware processor, perform the following in respect of the client device with which it is functionally associated:

receive a first audio and/or video content stream from at least one of said routers, and streaming said first stream to the client device;

receive from at least one of said routers a second audio and/or video content stream that is identical or nearly identical to the first stream while still receiving the first stream, the second stream having traversed the path through the second set of the routers prior to being received by the proxy module, the second stream having been instantiated in response to a network topology change during the streaming of said first stream to the client, the network topology change being:
  caused by a change in the number, identities and/or locations of one or more of the client devices; and/or
  triggered in response to a change in network conditions; and compare the first and second streams to determine a discrepancy measure indicative of whether the first and second streams are synchronised with each other, and if not, introducing a delay into one or other of said streams to decrease or remove any discrepancy in synchronisation between the respective streams; then switch from streaming the first stream to the client device, to streaming the second stream to the client device;

wherein the step of comparing comprises determining whether one or more elements of the second stream have arrived at the proxy module before or after one or more corresponding elements of the first stream, and if before, introducing a delay into the second stream prior to said switching then gradually decreasing said delay after said switching; and if after, gradually introducing a delay into the first stream prior to said switching.

* * * * *